United States Patent [19]

Hirota et al.

[11] Patent Number: 5,873,921
[45] Date of Patent: Feb. 23, 1999

[54] PROCESS FOR MANUFACTURING GLASS OPTICAL ELEMENTS

[75] Inventors: Shin-ichiro Hirota, Hachioji; Ken Uno, Higashiyamato; Hiroaki Takahara, Hino; Tadayuki Fujimoto, Hachioji; Hiroshi Enomoto, Yokohama, all of Japan

[73] Assignees: Hoya Precisions Inc., Nagano; Hoya Corporation, Tokyo, both of Japan

[21] Appl. No.: 881,751

[22] Filed: Jun. 24, 1997

Related U.S. Application Data

[63] Continuation of Ser. No. 526,702, Sep. 11, 1995, abandoned.

[30] Foreign Application Priority Data

| Sep. 9, 1994 | [JP] | Japan | 6-216142 |
| Sep. 9, 1994 | [JP] | Japan | 6-216241 |
| Oct. 7, 1994 | [JP] | Japan | 6-243901 |

[51] Int. Cl.$^6$ .................................................. C03B 40/04
[52] U.S. Cl. .......................... 65/25.1; 65/102; 65/120; 65/122; 65/124; 65/182.2; 65/374.15
[58] Field of Search ............................ 65/21.5, 25.1, 65/29.19, 29.21, 182.2, 102, 120, 122, 124, 374.15

[56] References Cited

U.S. PATENT DOCUMENTS

| 1,638,593 | 8/1927 | Mulholland | 65/182.2 X |
| 1,663,925 | 3/1928 | Steimer | 65/182.2 X |
| 2,805,898 | 9/1957 | Willis, Jr. | 65/182.2 X |
| 2,911,669 | 11/1959 | Beckwith | 65/102 |
| 3,264,720 | 8/1966 | Mott | 65/182.2 |
| 4,629,489 | 12/1986 | Hirota et al. | 65/102 |
| 4,778,505 | 10/1988 | Hirota et al. | 65/102 |
| 5,171,347 | 12/1992 | Monji et al. | 65/64 |
| 5,228,894 | 7/1993 | Sato et al. | 65/102 |
| 5,250,099 | 10/1993 | Kubo et al. | 65/102 |
| 5,284,501 | 2/1994 | Monji et al. | 65/32.5 |
| 5,344,476 | 9/1994 | Tomida | 65/102 |
| 5,346,522 | 9/1994 | Komiyama et al. | 65/64 |

FOREIGN PATENT DOCUMENTS

| 6472929 | 3/1986 | Japan . |
| 61-251529 | 11/1986 | Japan . |
| 61-286232 | 12/1986 | Japan . |
| 62-27334 | 2/1987 | Japan . |
| 62-113730 | 5/1987 | Japan . |
| 63-45134 | 2/1988 | Japan . |
| 63-46010 | 9/1988 | Japan . |
| 2-16251 | 4/1990 | Japan . |

*Primary Examiner*—Stanley S. Silverman
*Assistant Examiner*—Sean Vincent
*Attorney, Agent, or Firm*—Burns, Doane, Swecker & Mathis, L.L.P.

[57] ABSTRACT

Processes for manufacturing glass optical elements by press molding a heated and softened glass material in preheated molds. In the process, the glass material is heated while it is floated by a gas blow and the heated and softened glass material is transferred to the preheated molds and then subjected to press molding. Alternatively, the process comprises: heating a glass material at a temperature at which the glass material has a viscosity of lower than $10^9$ poises, preheating molds at a temperature at which the glass material has a viscosity of from $10^9$ to $10^{12}$ poises, subjecting the heated and softened glass material to initial press in the preheated molds for 3 to 60 seconds, starting to cool the vicinity of molding surfaces of the molds at a rate of 20° C./minute or higher upon starting of, or during, or after the initial press, and removing a molded glass article from the molds after the temperature of the vicinity of the molding surfaces of the molds becomes a temperature equal to or lower than a temperature at which the glass material has a viscosity of $10^{12}$ poises.

36 Claims, 19 Drawing Sheets

PROCESS FOR MANUFACTURING GLASS OPTICAL ELEMENTS

This application is continuation of application Ser. No. 08/526,702, filed Sep. 11, 1995, now abandoned.

BACKGROUND OF THE INVENTION

The present invention relates to a process for manufacturing glass optical elements such as glass lenses, which require no grinding and polishing after their press molding. In particular, the present invention relates to a process for manufacturing glass optical elements, which can improve production speed by markedly shortening the cycle time required for the press molding.

There have been known various processes for manufacturing glass optical elements, which require no grinding and polishing after their press molding, by molding glass preforms, which are glass materials to be further molded, in molds which ensure surface accuracy and surface roughness required for surfaces of molded glass articles.

For example, Japanese Patent Un-examined Publication (KOKAI, hereinafter referred to as "JP-A") No. 64-72929 and Japanese Patent Publication (KOKOKU, hereinafter referred to as "JP-B") No. 2-16251 disclose processes where molds and glass preforms are heated together. In these methods, a glass preform is inserted into a mold assembly comprising an upper mold, a lower mold and a guide mold which guides the upper mold and the lower mold, and the preform is heated together with the mold assembly to a temperature where the preform is softened sufficiently and then the preform is subjected to press molding. Then, they are cooled at such a cooling rate that surface accuracy of the glass article after molding is not deteriorated to a temperature around the glass transition temperature, or allowed to cool to room temperature with a certain period of time, and the molded glass article is removed from the mold assembly.

JP-A-62-113730 and JP-B-63-46010 disclose processes where a preliminarily softened glass preform is inserted into a separately heated mold assembly. In these methods, a glass preform placed on a ring-like member is softened by heating it together with the ring-like member, inserted into a mold assembly with the ring-like member and press molded between an upper mold and a lower mold which penetrates the ring-like member and lifts up the softened preform. Alternatively, the ring-like member acts as a guide mold guiding the upper mold and the lower mold to perform the press molding. JP-A-61-251529, JP-A-61-286232, JP-A-62-27334 and JP-A-63-45134 also disclose processes for molding glass optical elements where a preliminarily softened glass preform is inserted into a separately heated mold assembly. However, these processes have drawbacks that they occasionally cannot mold a desired shape when relatively large deformation of the glass material is required, and that they are likely to generate sink marks and distortion and thus difficult to obtain sufficient surface accuracy.

JP-A-62-27334 discloses a process where a glass preform is inserted into a mold assembly by using a ring-like member and molded, as well as temperature conditions for prolonging the lifetime of molds for such a process. In this method, the mold temperature is maintained within a temperature range of from a temperature just below the glass transition point to a temperature lower than the glass transition point by 200° C., and a glass preform, which has been preliminarily heated to such a temperature that the preform had a viscosity ranging from $10^6$ to $10^8$ poises, is inserted into the mold assembly and press molded.

In the above-mentioned processes where a preform is heated, molded and cooled with molds while the preform is maintained in a mold assembly, the temperatures of the glass and the molds are approximately the same throughout the molding process and hence there would be no temperature difference between the surface and the inside of the glass. Therefore, sink marks are prevented and thereby high surface accuracy is provided. However, since it requires a temperature elevating period before the pressing and a cooling period after the pressing and before the ejection, it has a drawback of extremely long cycle time required for the whole process. In addition, since the glass is contacted with mold surfaces for a long period of time during the heating and the pressing, it has also a drawback that the glass is likely to react with the mold surfaces and thereby the lifetime of the molds is shortened.

On the other hand, in the process where a glass preform which is preliminarily heated to have a higher temperature (low viscosity) than molds is inserted into the molds by using a ring-like member and press molded, press time may be very short. In addition, since the mold temperature may be relatively low and release of a molded glass from molds is possible after a relatively short period of time to allow the molded glass to cool after the pressing, the cycle time can be markedly shortened. However, if the preform is inserted into the molds at a low temperature (within a temperature range of from a temperature just below the glass transition point to a temperature lower than the glass transition point by 200° C.) to prolong the lifetime of the molds, the temperature of the glass surface is rapidly lowered and the glass is cooled and solidified before it is press molded to a desired thickness. Therefore, it has drawbacks that it cannot stably provide molded articles, especially glass molded articles with a small edge thickness (about 1.0 to 1.3 mm) such as biconvex lenses and meniscus lenses, and that it shows insufficient surface accuracy.

To solve the above-described problems, it has been proposed to use a glass preform showing a further lower viscosity under similar temperature conditions of molds. However, as the viscosity becomes lower, the softened preform on the ring-like member becomes more likely to sag at the opening of the ring member (deformed and hanged down). For example, though it depends on the shape of the preform, when the viscosity is $10^7$ poises or lower, the preform is very likely to sag. Therefore, to prevent deformed preform from dropping down from the ring-like member, it is necessary to use a glass preform having an outer diameter quite larger than the inner diameter of the preform supporting portion of the ring-like member. As a result of it, press molded lenses have a quite larger outer diameter than desired and hence it is necessary to cut off a large surplus in a post-processing so that they have a desired outer diameter. Further, in this method using a ring-like member, since molding flash is produced due to the use of a preform larger than the final product and the generation of surplus and, since a low mold temperature is used, it is very difficult to produce biconvex lenses, meniscus lenses and the like with a small edge thickness.

Therefore, one of the objects of the present invention is to provide a process for manufacturing glass optical elements by press molding a heated and softened glass material such as a glass preform in preheated molds, wherein the glass material is easily held during its heating and softening even if a glass material such as a glass preform of which viscosity is decreased when it is softened and hence which is likely to deform is used and thus a glass optical element can be produced.

A further object of the present invention is to provide a process capable of satisfactorily manufacturing glass optical elements by transferring a heated and softened glass preform and the like, which is prone to be deformed, to molds without unduly deforming it.

A further object of the present invention is to provide a process for manufacturing glass optical elements, which uses a glass material such as a glass preform which enables to provide a molded glass with a size approximately the same with an effective outer diameter desired for a purpose glass optical element and therefore can minimize an edging volume for centering in a post-processing.

A further object of the present invention is to provide a process for manufacturing glass molded articles of which cycle time required for press molding is remarkably shortened and which can provide glass molded articles with no surface defects and with high surface accuracy.

An additional object of the present invention is to provide a process capable of easily manufacturing biconvex lenses, meniscus lenses and the like with a small edge thickness.

A still further object of the present invention is to provide a process capable of transferring a heated and softened glass gob, which is prone to be deformed, to molds to satisfactorily manufacture glass optical elements.

One of the objects of the present invention is to provide a process for manufacturing glass optical elements by press molding a heated and softened glass material such as a glass preform in a preheated molds, which can remarkably shorten the cycle time required for the press molding, stably provide lenses and the like even though they must have a small edge thickness and show good surface accuracy.

A further object of the present invention is to provide a process for manufacturing glass optical elements without sink marks and distortion and with high surface accuracy.

A further object of the present invention is to provide a process capable of manufacturing glass optical elements without sink marks and distortion and with high surface accuracy and a center thickness within an allowance.

SUMMARY OF THE INVENTION

The present invention provides, as a first aspect of the invention, a process for manufacturing glass optical elements by press molding a heated and softened glass material in preheated molds, wherein the glass material is heated while it is floated by a gas blow and the heated and softened glass material is transferred to the preheated molds and then subjected to press molding.

In one embodiment of the above-described process, the heated and softened glass material is transferred to the preheated molds by dropping the material.

In another embodiment of the above-described process, a heated and softened glass material is transferred to the preheated molds by holding the glass material by suction or placing it on a ring-like member having an inner diameter smaller than the outer diameter of the glass material and subjected to press molding.

In another embodiment of the above-described process, a heated and softened glass material is transferred to the preheated molds by splitting a floating means used for heating the glass material into two or more pieces and removing the pieces to drop the glass material and the glass material is subjected to press molding.

The present invention further provides, as a second aspect of the invention, a process for manufacturing glass optical elements by press molding a heated and softened glass material in preheated molds, which comprises:

heating a glass material at a temperature at which the glass material has a viscosity of lower than $10^9$ poises, preheating molds at a temperature at which the glass material has a viscosity of from $10^9$ to $10^{12}$ poises, subjecting the heated and softened glass material to initial press in the preheated molds for 3 to 60 seconds, starting to cool the vicinity of molding surfaces of the molds at a rate of 20° C./minute or higher upon starting of, or during, or after the initial press, and removing a molded glass article from the molds after the temperature of the vicinity of the molding surfaces of the molds becomes a temperature equal to or lower than a temperature at which the glass material has a viscosity of $10^{12}$ poises.

In one embodiment of the second aspect of the present invention described above, the molding surfaces of the molds have an amorphous and/or crystalline carbon monocomponent or mixture layer of graphite structure and/or diamond structure.

DESCRIPTION OF THE PREFERRED EMBODIMENTS

First Aspect of the Invention

The process according to the first aspect of the present invention is a process for manufacturing glass optical elements by press molding a heated and softened glass material to be molded in preheated molds.

Types, shapes and the like of the glass materials used for the present invention may be conventional ones. However, the glass materials used for the present invention are preferably utilized at a relatively low viscosity. For example, heated and softened glass materials preferably has a viscosity of from $10^{5.5}$ to $10^{9.0}$ poises.

The glass materials may be in the form of, for example, a glass preform or glass gob. Glass preform is a term to refer to a molded article having a desired shape to be used as a precursor for manufacturing glass optical elements. The glass preforms may be those obtained by cold forming or hot forming of molten glass and may be such preforms further subjected to mirror polishing and the like. Further, the preforms may have rough surfaces, rather than mirror surfaces, and, for example, may be ground articles ground with #800 diamond.

The shape of the glass preforms is decided considering sizes, volumes of products, i.e., glass optical elements, their volume changes upon molding and the like. Further, in order to prevent formation of gas traps upon molding, it is preferred that glass preforms have such a shape that centers of molds initially contact with surfaces of the preforms to be molded. For example, glass preforms may be spheres, or have marble-like, disc-like shapes, or shapes having spherical surfaces and the like.

Glass gobs are glass pieces obtained by splitting molten glass into a desired volume and they usually have irregular chill marks. Examples of the above-described glass preforms are obtained by molding these glass gobs into a desired shape. Glass gobs are softened by heating while they are floated, and they may be heated so that they have a glass viscosity of $10^5$ poises or lower to eliminate wrinkles (chill marks) on their surfaces.

Volumes of glass preforms or gobs may be slightly larger than those of final products and, in such a case, final outer diameters can be obtained by subjecting the molded articles to edging in post-processing.

For the present invention, mold structure may have a structure where pressure is applied to molded articles (optical elements) during cooling after molding, or a structure where pressure can be reduced after initial press. Further, they may have a structure where pressure is applied by weight of upper molds after the initial press. Molds can be heated by resistance heaters, high-frequency heaters, infrared lamp heaters and the like. In particular, high-frequency heaters and infrared lamp heaters are preferred, since they can recover mold temperature in a short period of time. Cooling of molds can be performed by electric cut cooling, cooling gas passing through inside of molds and the like.

Figure 1:
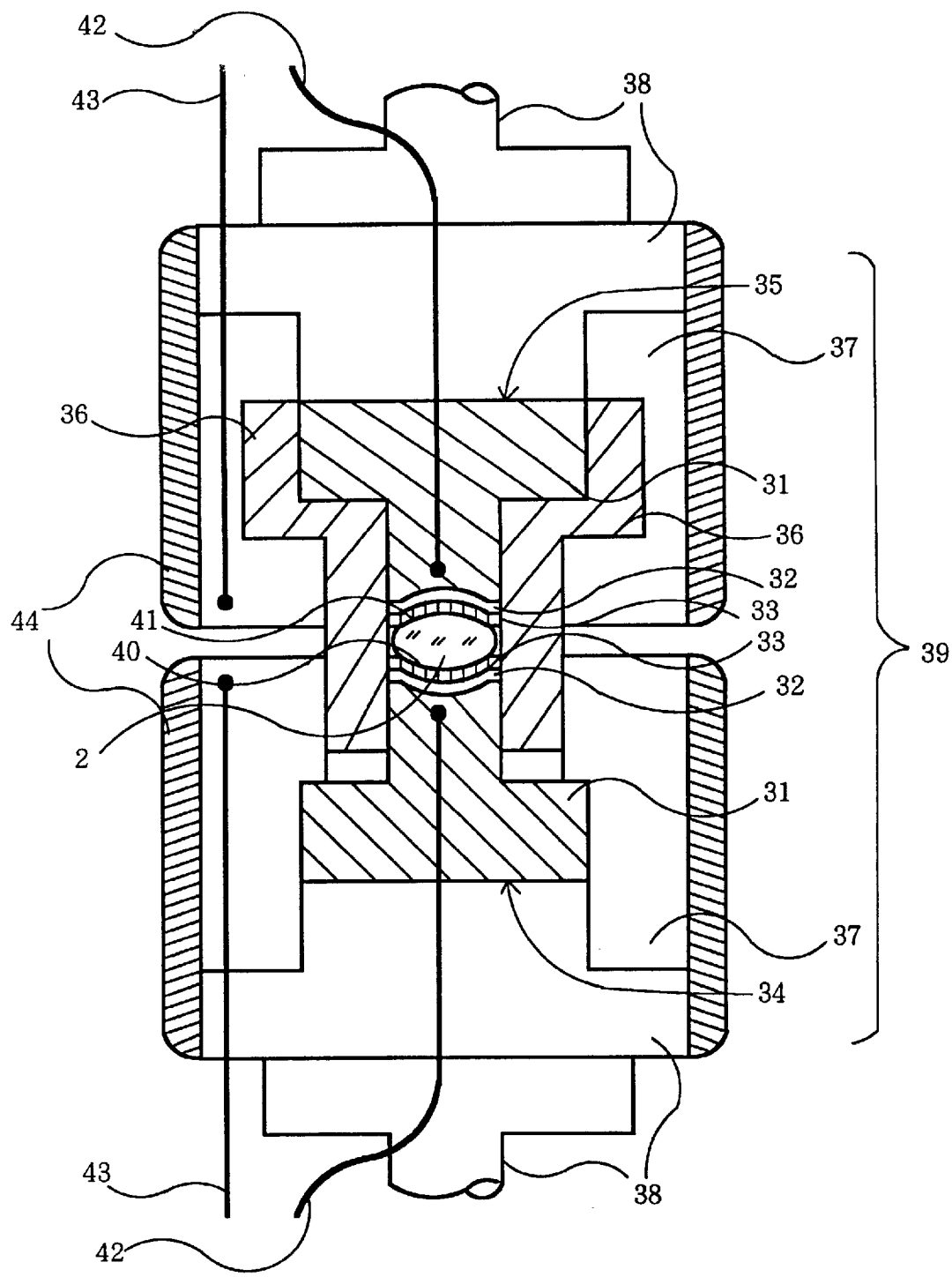
FIG. 1 is an explanatory schematic view of press molding in a mold assembly used in the present invention.

The molds used for the present invention may be, for example, a mold assembly 39 comprising an upper mold 35, a lower mold 34 and a guide mold 36 as shown in FIG. 1. However, molds are not limited to it. The molds may be those obtained by forming a silicon carbide layer on a silicon carbide sintered body by a CVD technique and forming thereon an i-carbon (diamond-like carbon) layer by an ion-plating technique. Also used are those composed of silicon, silicon nitride, tungsten carbide or cermets of aluminum oxide-base and cermets of titanium carbide-base and such materials of which surfaces are preferably further coated with diamond, heat resistant metals, noble metal alloys, ceramics of carbides, nitrides, borides, oxides and the like. Those having carbon coatings such as i-carbon coatings are particularly preferred, because they show excellent releasability.

Conditions for press molding may be suitably selected depending on temperatures (viscosities) of glass materials such as preforms and gobs and temperatures of molds and the like. Normally, molding is performed by pressing at a pressure of from 30 to 300 $kg/cm^2$ for 3 to 60 seconds, preferably 5 to 30 seconds. Temperature of glass materials, mold temperature and mold release temperature may also be optionally selected.

The manufacturing process according to the first aspect of the present invention is characterized in that preheating of a glass material is carried out by heating the glass material while it is floated by a gas blow and the heated and softened glass material is transferred to the preheated molds.

In a viscosity range where the glass materials are deformed by their own weight, it is not easy to prevent adhesion between the glass materials and the means for supporting the glass materials upon heating. According to the present invention, the glass materials are floated by a gas blow, for example, by blowing gas from inside of the supporting means. As a result, gas layers are formed on both surfaces of the means and the glass materials and it is made possible to heat and soften the glass materials while obviating any reaction between the supporting means and the glass materials. Further, when the glass material is a glass preform, the glass preform may be heated and softened while the shape of the preform is substantially maintained. When the glass material is a glass gob, it is possible to deform the gob to obtain its appropriate shape and eliminate its surface defects by heating and softening it while it is floated by a gas blow even if the glass gob has had an irregular shape and surface defects such as wrinkles.

Gas for the gas blow used for floating the glass materials in the present invention is not particularly limited. However, it is preferably a non-oxidative gas such as nitrogen, since the heated glass material should not react with the supporting means and deterioration of the supporting means by oxidation should be prevented. Reducing gas such as hydrogen gas may be added to the gas.

Flow rate of the gas may be suitably selected depending on shapes of an outlet for the gas blow, shapes and weights of the glass materials and the like. Normally, a flow rate ranging from 0.005 to 20 liters/minute is suitable for floating the glass materials. When the flow rate is lower than 0.005 liters/minute, it may sometimes be impossible to satisfactorily float the glass materials. When the flow rate exceeds 20 liters/minute, the glass material above the supporting means is unduly swayed and, when the glass material is a glass preform, it may be deformed upon heating even though it has a weight of not less than 2000 mg.

Conditions for heating and softening the glass materials may be suitably selected depending on types of the glass materials and the like and adjusted so that softened glass materials have a desired viscosity.

Figure 2:
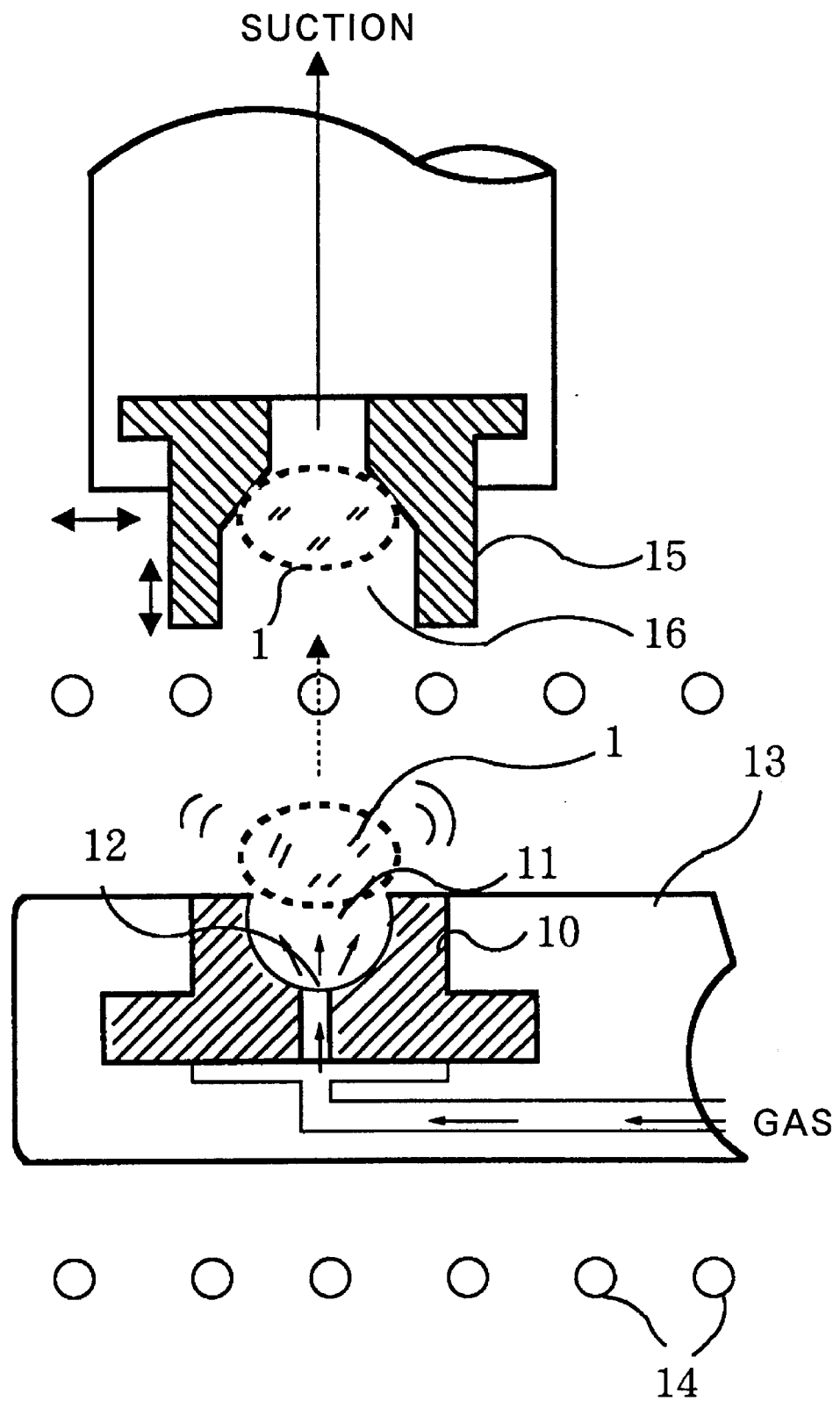
FIG. 2 is an explanatory schematic view of the method for softening a floating glass preform above a floating means and transferring the preform according to the present invention.
Figure 3:
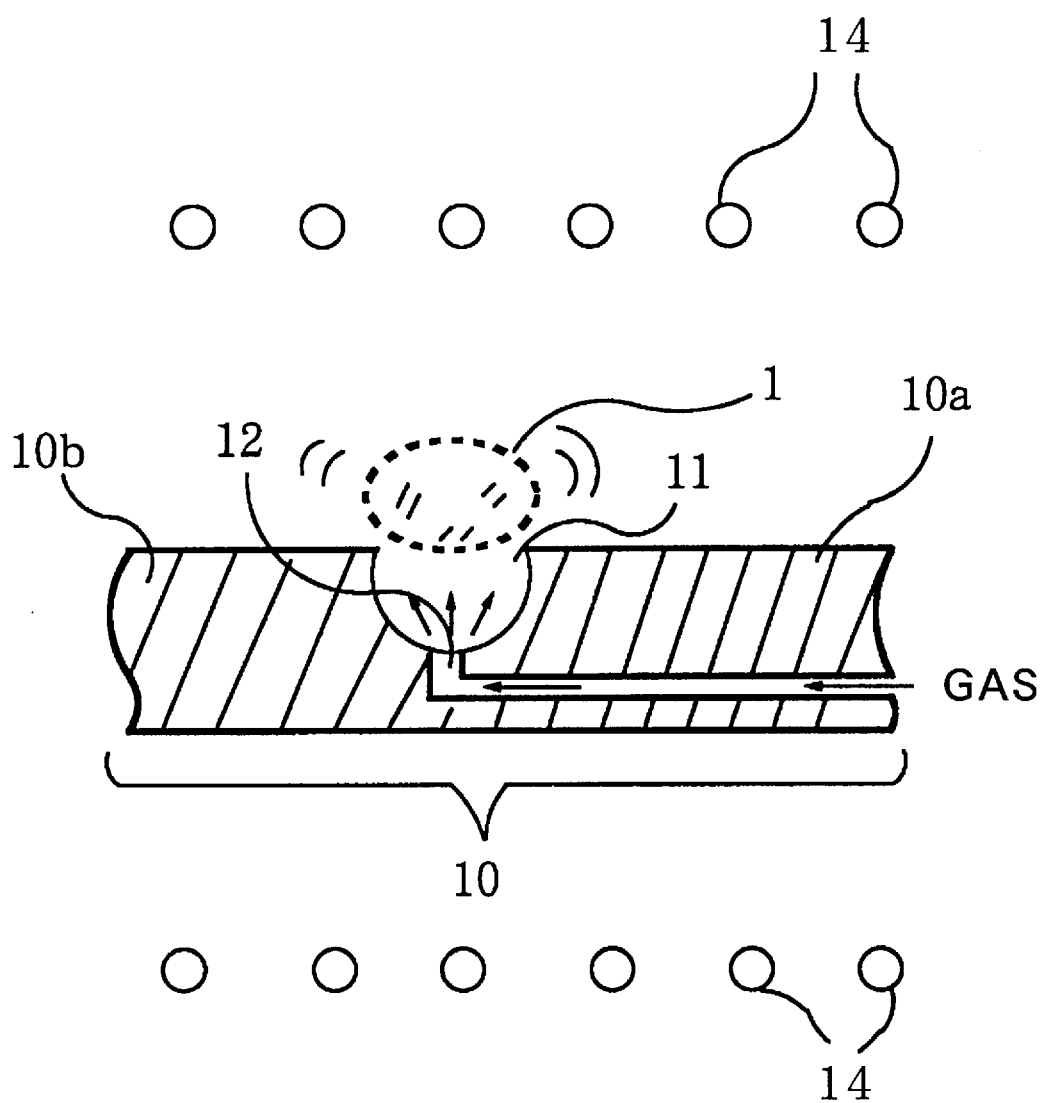
FIG. 3 is an explanatory schematic view of the method for softening a floating glass material above a floating means according to the present invention.

The glass materials can be floated by a gas blow which is blown off upward from an upper opening having an opening diameter smaller than a diameter of the glass materials. As shown in FIG. 2, an upper opening 11 of a floating means 10 has a diameter smaller than that of a glass material 1, and the glass material 1 is floated and maintained above the upper opening 11 by a gas blow blowing off upward from the bottom 12 of the upper opening 11 of the floating means 10 so that the material is not contacted with the floating means 10. The floating means 10 may be, as shown in FIG. 3, composed of separable two portions 10a and 10b. The glass material 1 is heated by surrounding heaters for softening glass 14.

The glass materials may be, whether they may be a glass preform or gob, floated by a gas blow as shown in FIG. 3.

The glass materials may also be floated by a gas blow blowing off from a spherically hollowed surface of a porous material having a curvature similar to that of the shape of glass material or a flat surface of a porous material. In particular, when the glass material is a glass preform, it is effective since it makes it very easy to maintain the shape of the preform. When the glass material is a glass gob, it is also possible to easily eliminate surface defects of the glass gob by heating it while it is floated by a gas blow from a porous surface.

Figure 4:
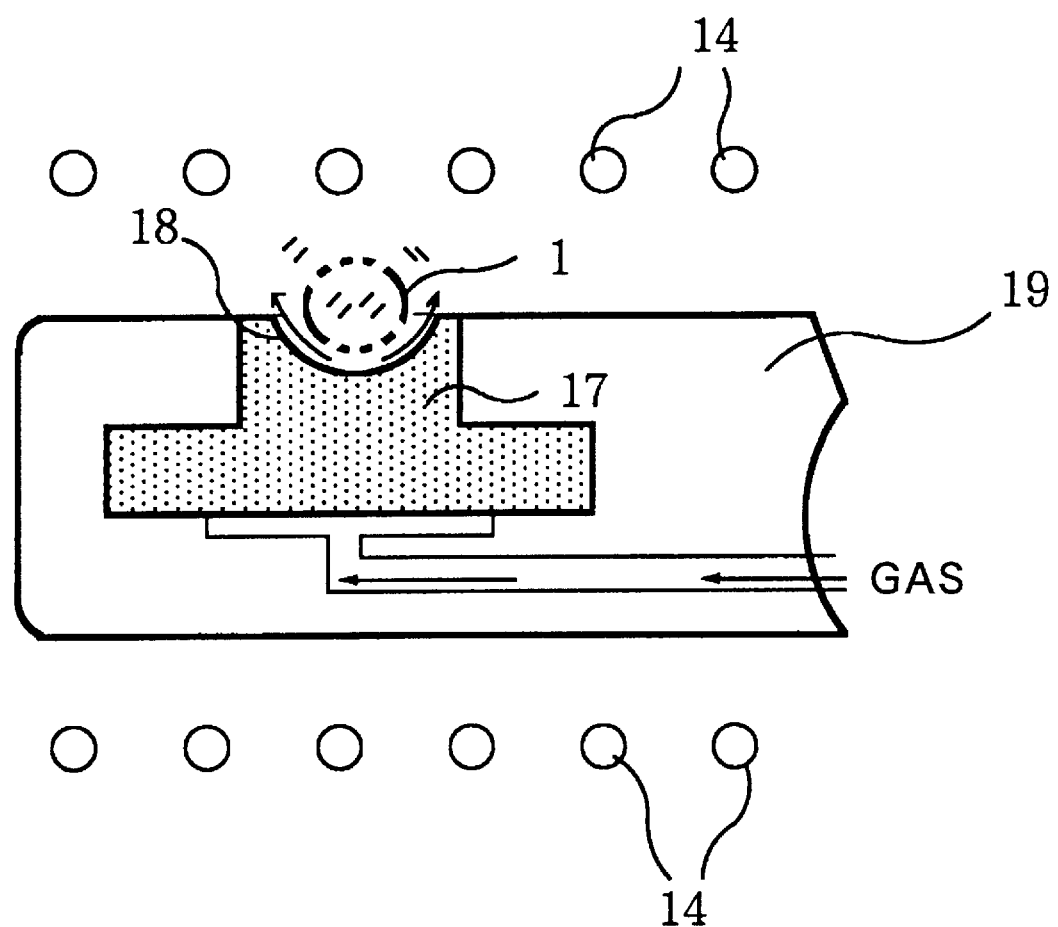
FIG. 4 is an explanatory schematic view of the method for softening a floating glass preform above a floating means according to the present invention.

As shown in FIG. 4, the glass material 1 is maintained in a floating state by a gas blow blowing off from the porous surface 18 above the floating means 17, which is supported by a floating means support 19 and has a spherical porous surface 18 of which curvature is similar to that of the glass material 1. The floating means support 19 and the floating means 17 may have, like in FIG. 3, a split structure. The glass material 1 is heated by the surrounding heaters for softening glass 14.

The heating of the glass materials includes heating the materials of an ambient temperature to a desired temperature, or heating the material of a somewhat elevated temperature to a desired temperature. In addition, a glass material already heated to a desired temperature may also be used. For example, when the glass material is a glass gob, a glass gob made of molten glass may be used without cooling it.

Therefore, the present invention encompasses a process for manufacturing glass optical elements by press molding a heated and softened glass material in preheated molds, wherein the glass material is a softened glass gob which is obtained by taking a portion of molten glass and the glass gob is floated by a gas blow to eliminate surface defects of the glass gob, then transferred to the preheated molds and press molded.

To obtain a glass gob by taking a portion from molten glass, any conventional method can be used. For example, a softened glass gob with a desired volume can be obtained by cutting off a glass piece from molten glass melted at a desired temperature. Elimination of surface defects of glass gobs can be efficiently performed by floating the glass gobs having a viscosity of not more than $10^5$ poises by a gas blow.

Figure 5:
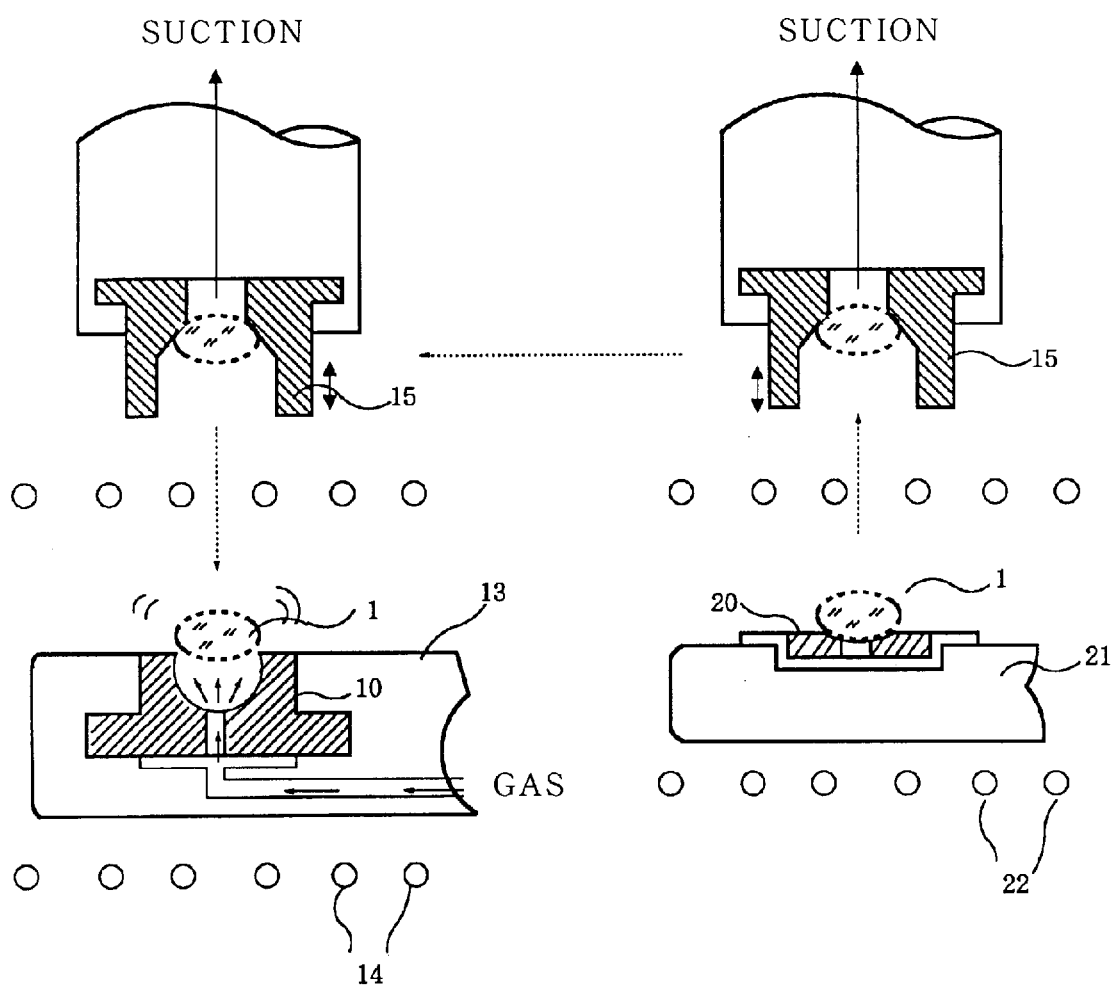
FIG. 5 is an explanatory schematic view of the method for softening a floating glass preform above a floating means according to the present invention.

When the glass material is a glass preform, it may first be heated to a temperature lower than its glass transition temperature by 30° C. or more and then further heated to a desired temperature while it is floated by a gas blow. Such a process is shown in FIG. 5. As shown in FIG. 5, the glass material 1 is heated on a means for supporting glass material 20 to a temperature lower than the glass transition temperature by 30° C. or more. Then, the heated glass material 1 is transferred to such a floating means as shown in FIG. 2 or 3 by means of an appropriate transfer means. In FIG. 5, exemplified is transfer of glass material 1 to a floating means 10 by means of a movable suction holding means 15 having a lower opening. For the transfer of the heated glass material 1, any means other than the above-described suction holding means, such as a ring-like member on which a glass material is placed may also be used.

Figure 6:
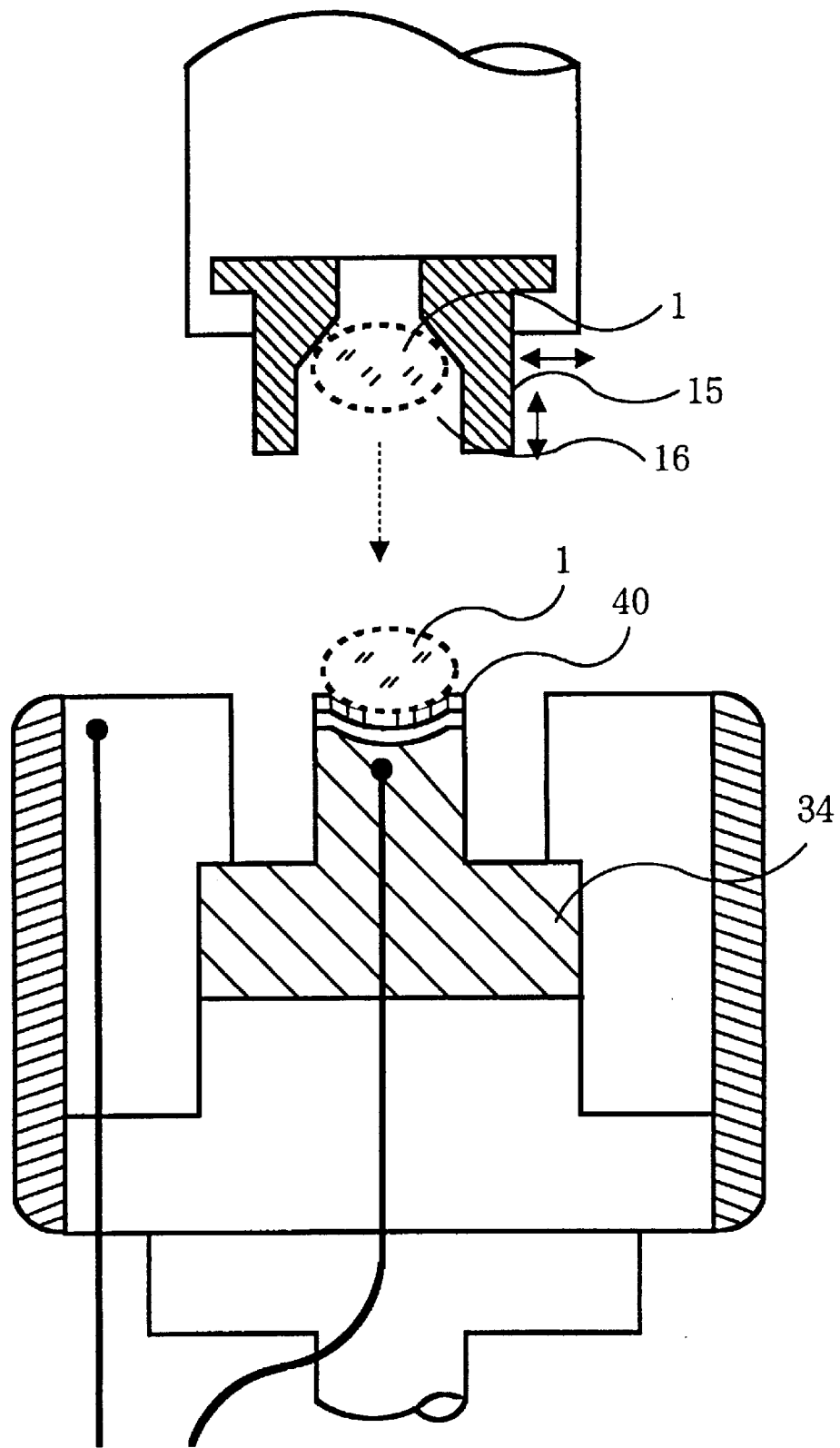
FIG. 6 is an explanatory schematic view of the method for transferring a softened glass preform to molds according to the present invention.

In one embodiment, a heated and softened preform may be transferred to preheated molds by holding the preform by suction. For example, such transfer may be performed by the movable suction holding means 15 having a lower opening 16 shown in FIG. 2. The lower opening 16 is connected to a means for internally sucking such as reduced pressure pumps and vacuum pumps and the lower opening 16 is capable of holding a glass preform by suction. A glass preform 1 heated and softened above the floating means 10 is held at the lower opening 16 of the movable holding means 15 by suction and transferred to a position over the molding surface 40 of the lower mold 34 as shown in FIG. 6. Then, the softened preform 1 is press molded by the molding surface 40 of the lower mold 34 and the molding surface 41 of the upper mold 35 as shown in FIG. 1 to give an glass optical element 2.

Figure 7:
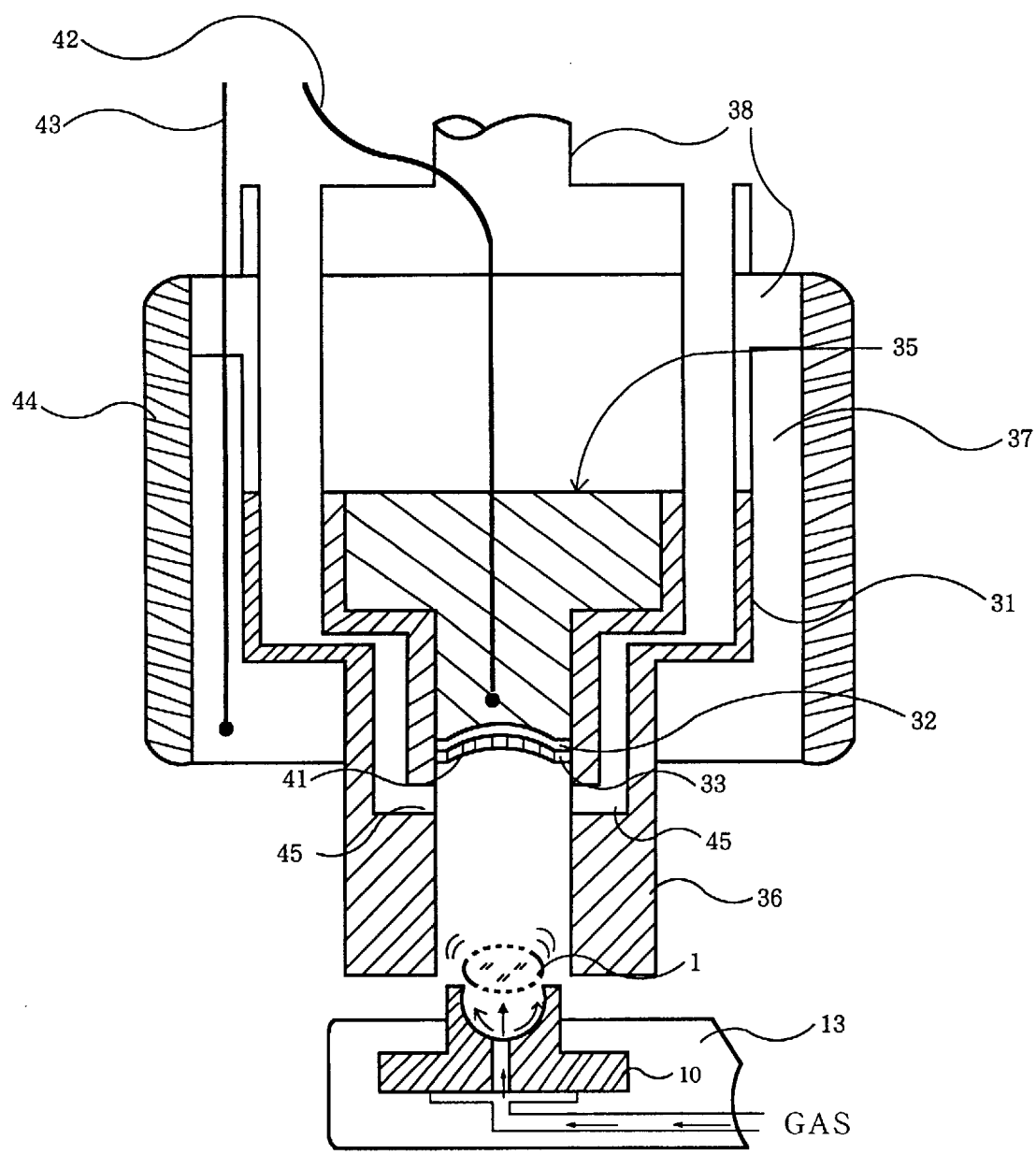
FIG. 7 is an explanatory schematic view of the method for transferring a glass preform softened above a floating means to molds by sucking according to the present invention.
Figure 8:
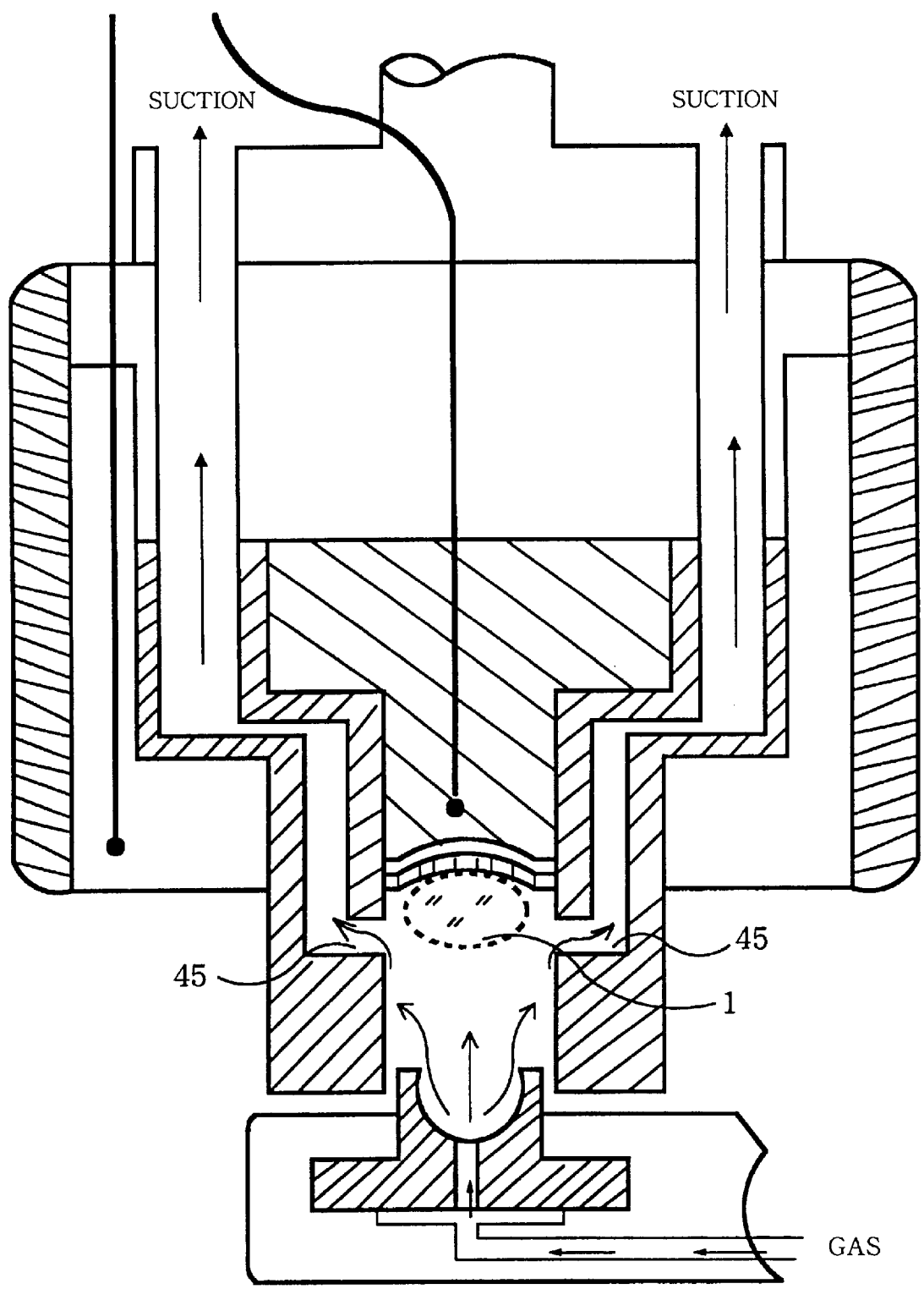
FIG. 8 is an explanatory schematic view of the method for transferring a glass preform softened above a floating means to the molds by sucking according to the present invention.
Figure 9:
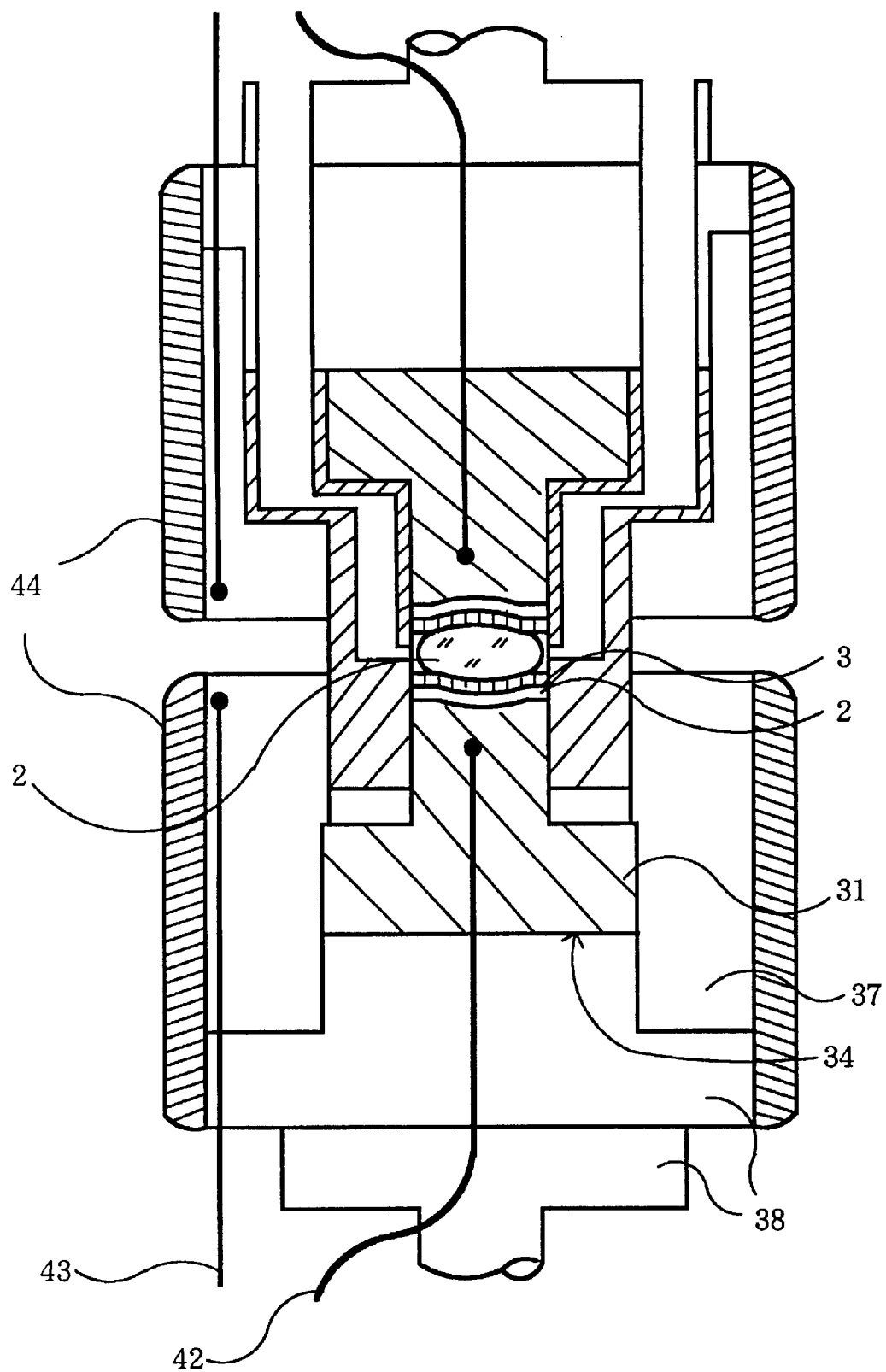
FIG. 9 is an explanatory schematic view of the press molding in a mold assembly used in the present invention.

The heated and softened preform may also be held by suction by sucking from suction holes provided in the vicinity of the molding surface of the upper mold. For example, it may be held by sucking from the suction holes 45 provided on the guide mold 36 disposed in the vicinity of the molding surface 41 of the upper mold 35 shown in FIG. 7. As shown in FIG. 7, the softened preform 1 above the floating means 10 is transferred to a position near the lower opening of the guide mold 36 provided together with the upper mold 35, and then, as shown in FIG. 8, the preform 1 is lifted and stuck to the molding surface 41 by sucking from the suction holes 45 of the guide mold 36. Then, the floating means 10 is removed, a lower mold is transferred to a position under the softened preform or the softened preform held by suction at the vicinity of the molding surface of the upper mold is transferred to a position over a molding surface of the lower mold, and the preform may be press molded by the molding surfaces of the upper mold and the lower mold (FIG. 9).

Transfer of a heated and softened preform to preheated molds may also be performed by placing the preform on a ring-like member having an inner diameter smaller than the outer diameter of the preform and holding by suction the member on which the preform is placed.

Figure 10:
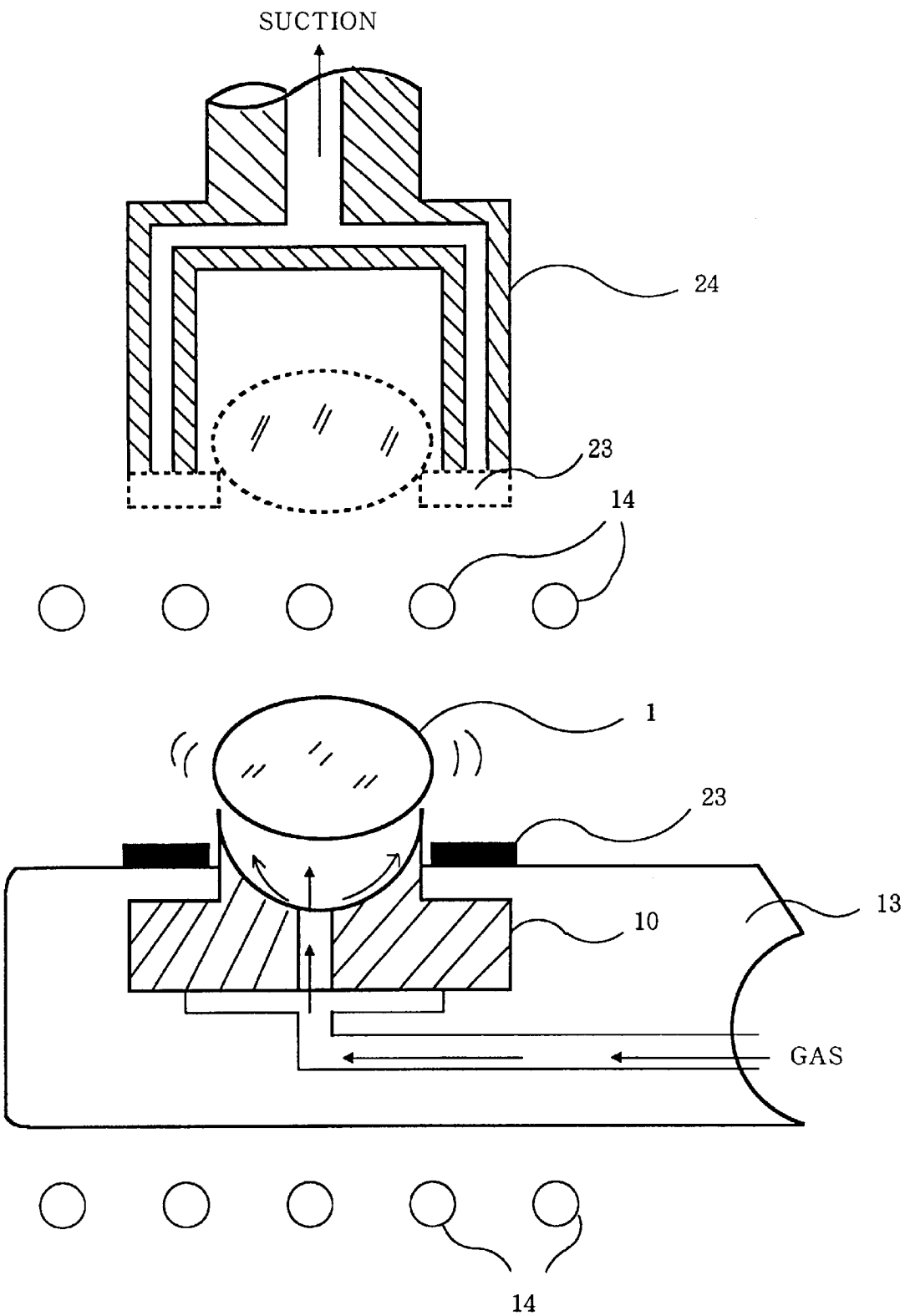
FIG. 10 is an explanatory schematic view of the method for transferring a softened glass preform to molds according to the present invention.

For example, as shown in FIG. 10, a ring-like member 23 having an inner diameter slightly larger than the outer diameter of the upper opening of the floating means 10 and smaller than the outer diameter of the preform 1 is placed so that the upper opening of the floating means 10 is positioned within the ring of the ring-like member 23. After the preform is softened to a desired viscosity, the preform heated and softened while floating above the floating means 10 is placed on the ring-like member 23 and transferred. For the transfer of the ring-like member 23, vacuum pad 24 capable of holding the ring-like member 23 by suction is exemplified in FIG. 10. However, means for transferring the ring-like member is not particularly limited.

Figure 11:
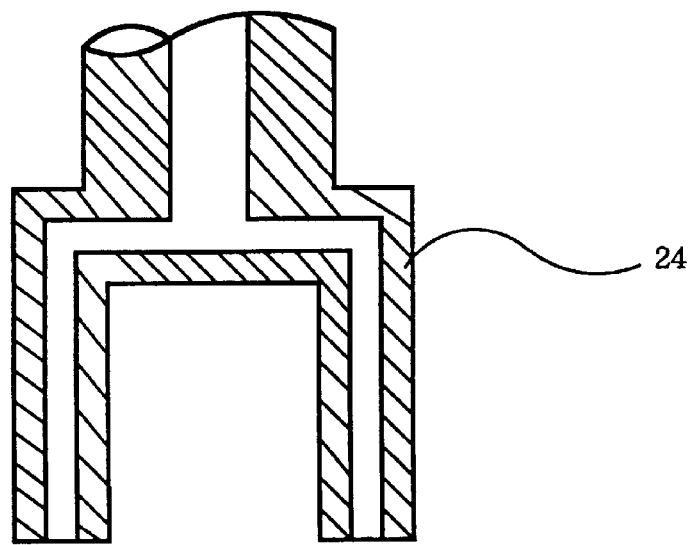
FIG. 11 is an explanatory schematic view of the method for transferring a softened glass preform to molds according to the present invention.
Figure 11:
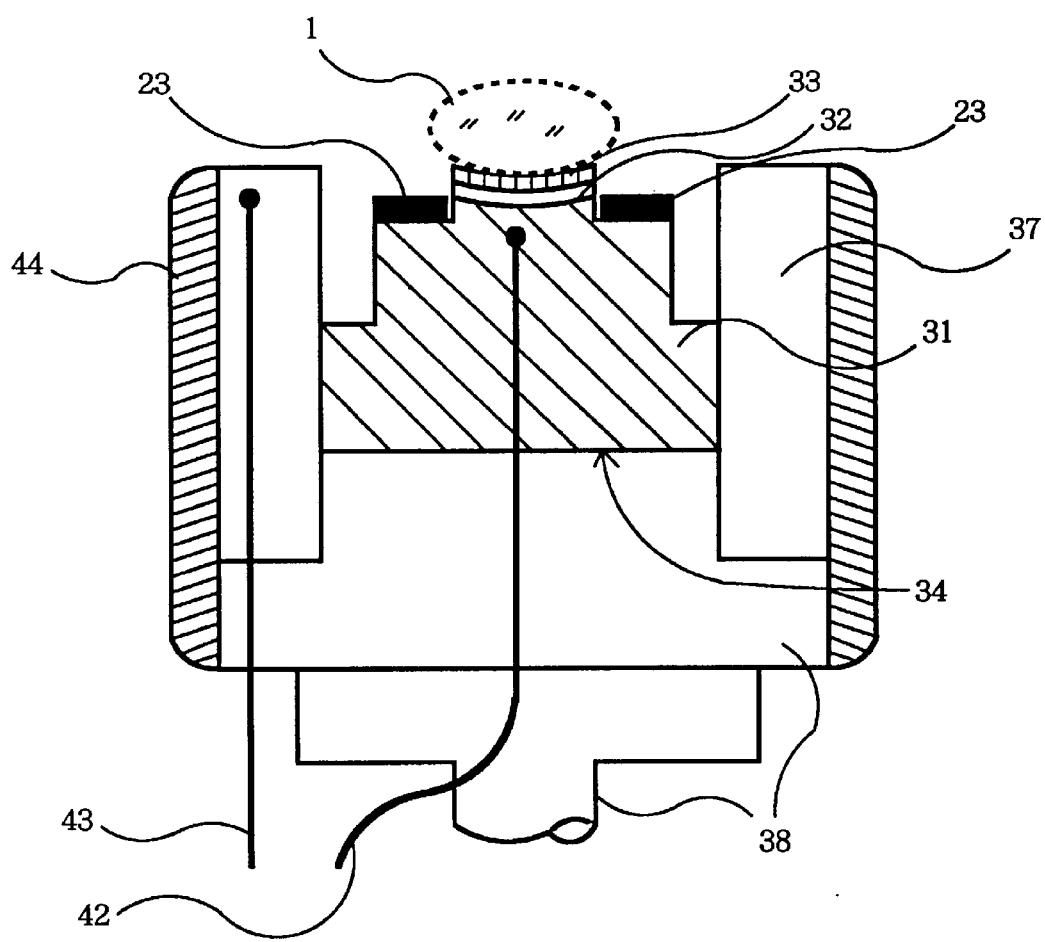

Then, as shown in FIG. 11, the preform 1 is transferred to a position over the molding surface 40 of the lower mold 34 on which the preform 1 is to be placed, and the suction of vacuum pad 24 is stopped to place the preform 1 on the molding surface 40. The preform 1 on the molding surface 40 is press molded between the upper and lower molds as shown in FIG. 1.

Figure 12:
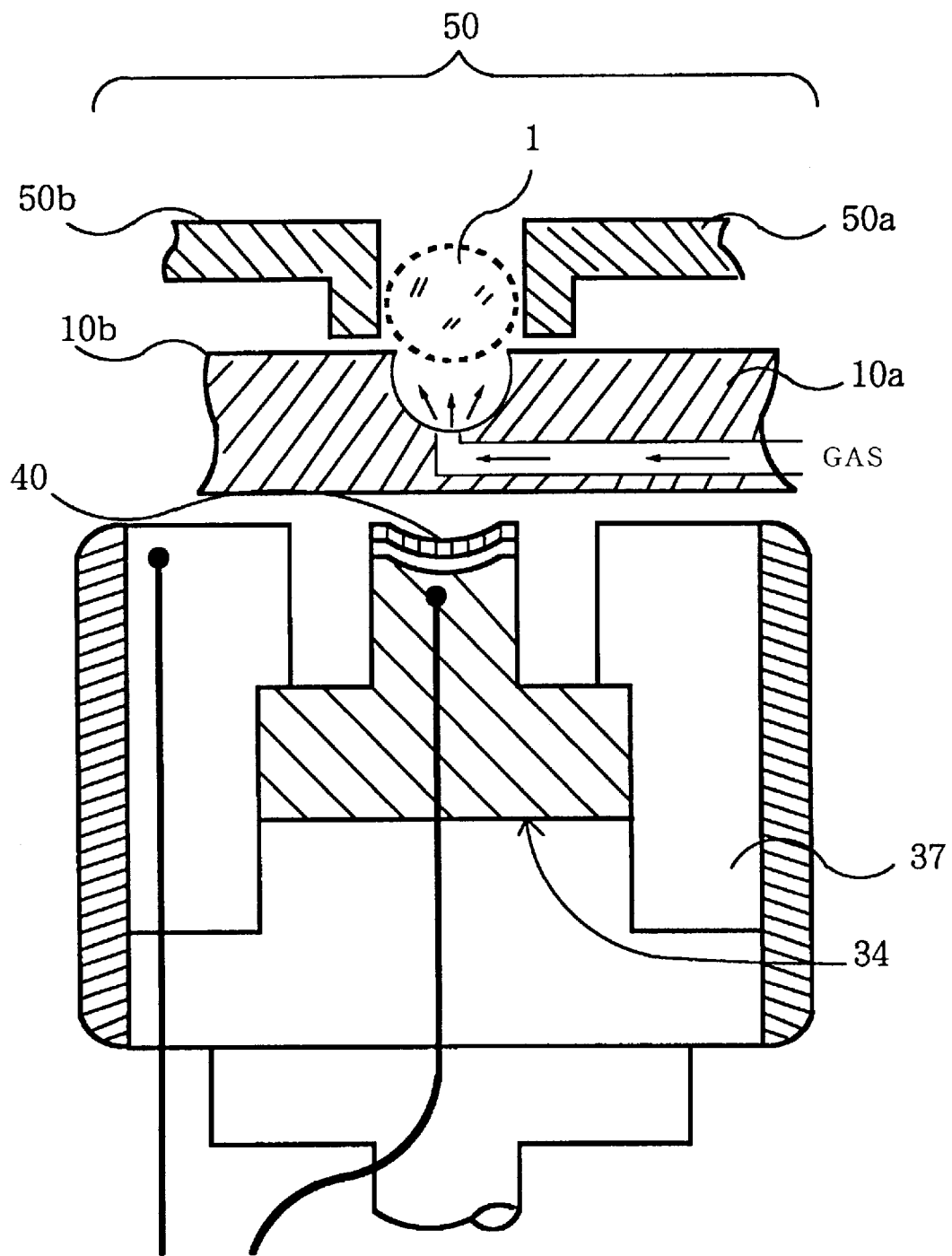
FIG. 12 is an explanatory schematic view of the method for transferring a softened glass preform to molds according to the present invention.
Figure 13:
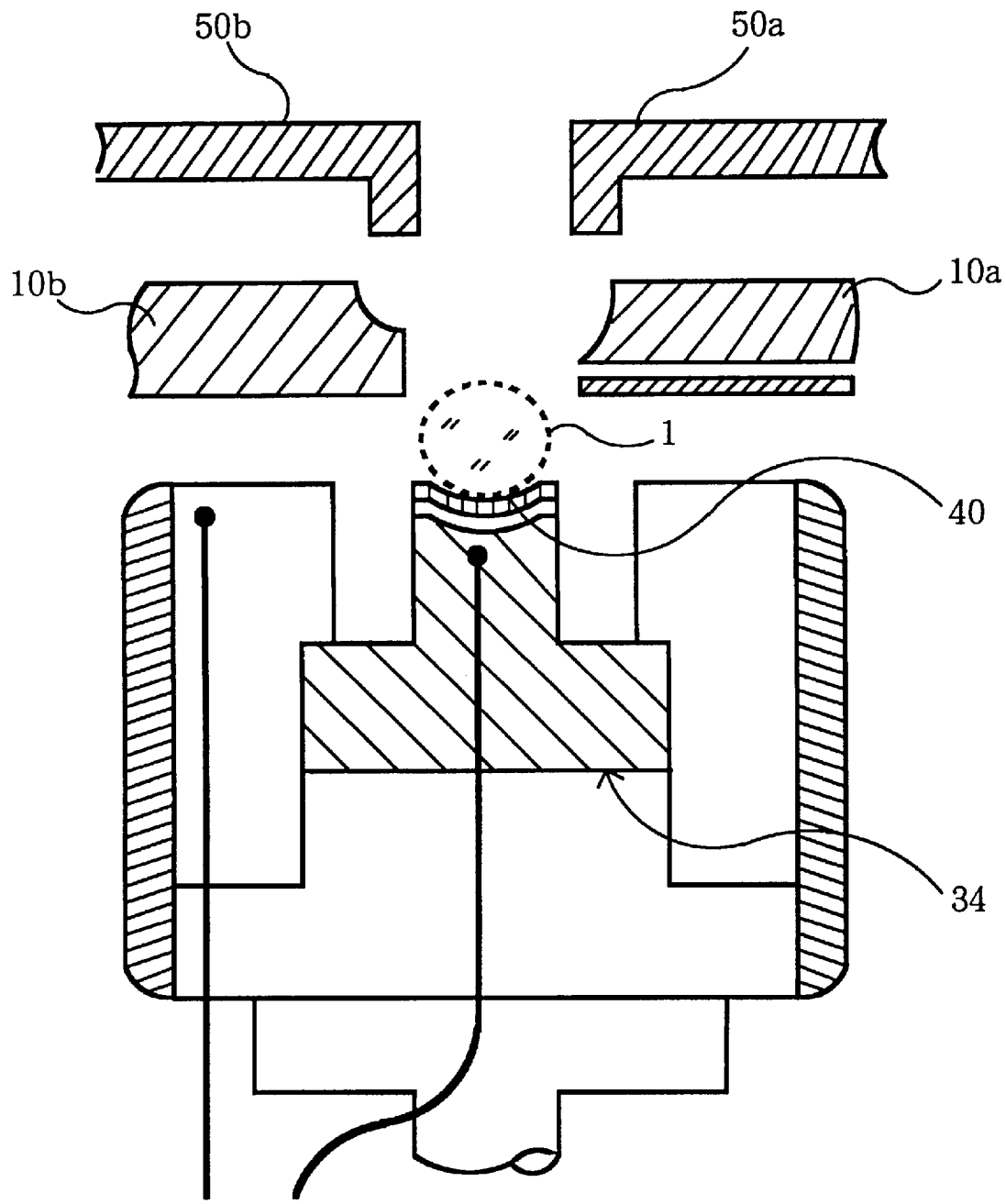
FIG. 13 is an explanatory schematic view of the method for transferring a softened glass preform to molds according to the present invention.

In another embodiment according to the first aspect of the present invention, the transfer of the heated and softened glass material is performed by dropping the softened glass material. The heated and softened glass material may be dropped, for example, by splitting a floating means into two or more pieces and removed the pieces to make an opening under the material. For example, as shown in FIG. 12, the glass material 1 is softened by heating above the floating means 10 and then the glass material 1 is dropped since the floating means 10 is horizontally separated into two parts, 10a and 10b, and moved to opposite directions (right and left in the figures) as shown in FIG. 13. The lower mold 34 is provided as a receiver of the dropped glass material 1 and thus the glass material 1 is transferred onto the molding surface 40 of the lower mold 34 in a moment.

Further, in the above-described embodiment, a guide means may be utilized to drop and transfer the heated and softened glass material onto the center position of the molding surface without any deviation. For example, as shown in FIGS. 12 and 13, the cylindrical guide means 50 having an inner diameter capable of providing an appropriate clearance against the maximum outer diameter of the glass material 1, which is composed of separable portions 50a and 50b, is provided above the floating means 10, and thus the glass material can be dropped onto the center of the mold. Structure and the like of the guide means would not be particularly limited, so long as it can prevent deviation of the glass material upon split and removal of the floating means. For example, the guide means may be composed of, not a cylinder, but a plurality of pipes arranged as a grille, or two or more facing panels. The guide means may have a structure which can be removed as two or more portions. Further, the guide means may be provided under the floating means.

Structure for separating and removing the floating means used for heating the glass material is not particularly limited. For example, when the floating means is moved horizontally as described above, the floating means may be separated into three or four portions and the respective portions may be removed along three directions (adjacent directions are different by 120°) or four directions (adjacent directions are different by 90°) respectively to drop the glass material.

Figure 14:
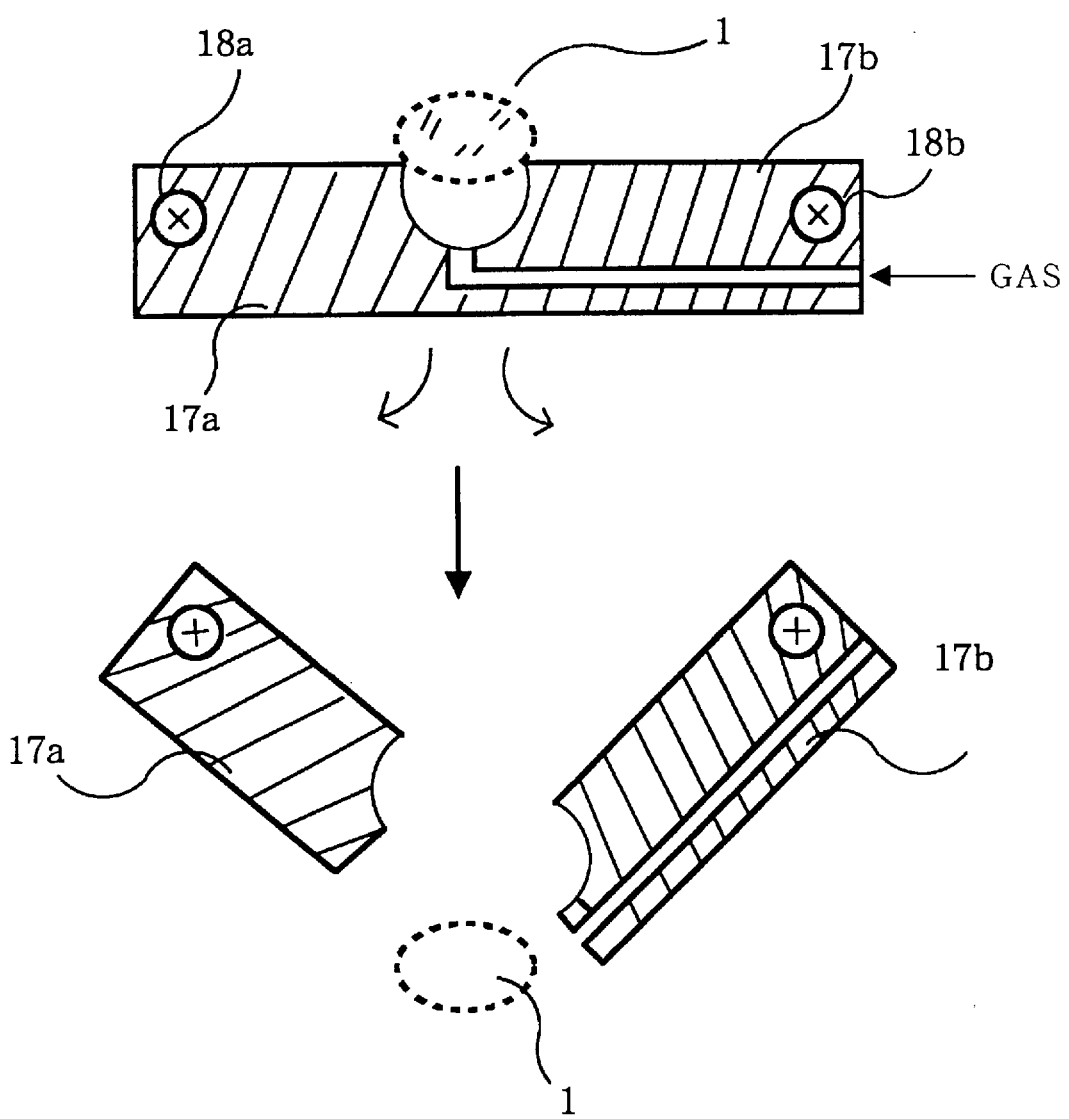
FIG. 14 is an explanatory schematic view of the method for transferring a softened glass preform to molds according to the present invention.
Figure 15:
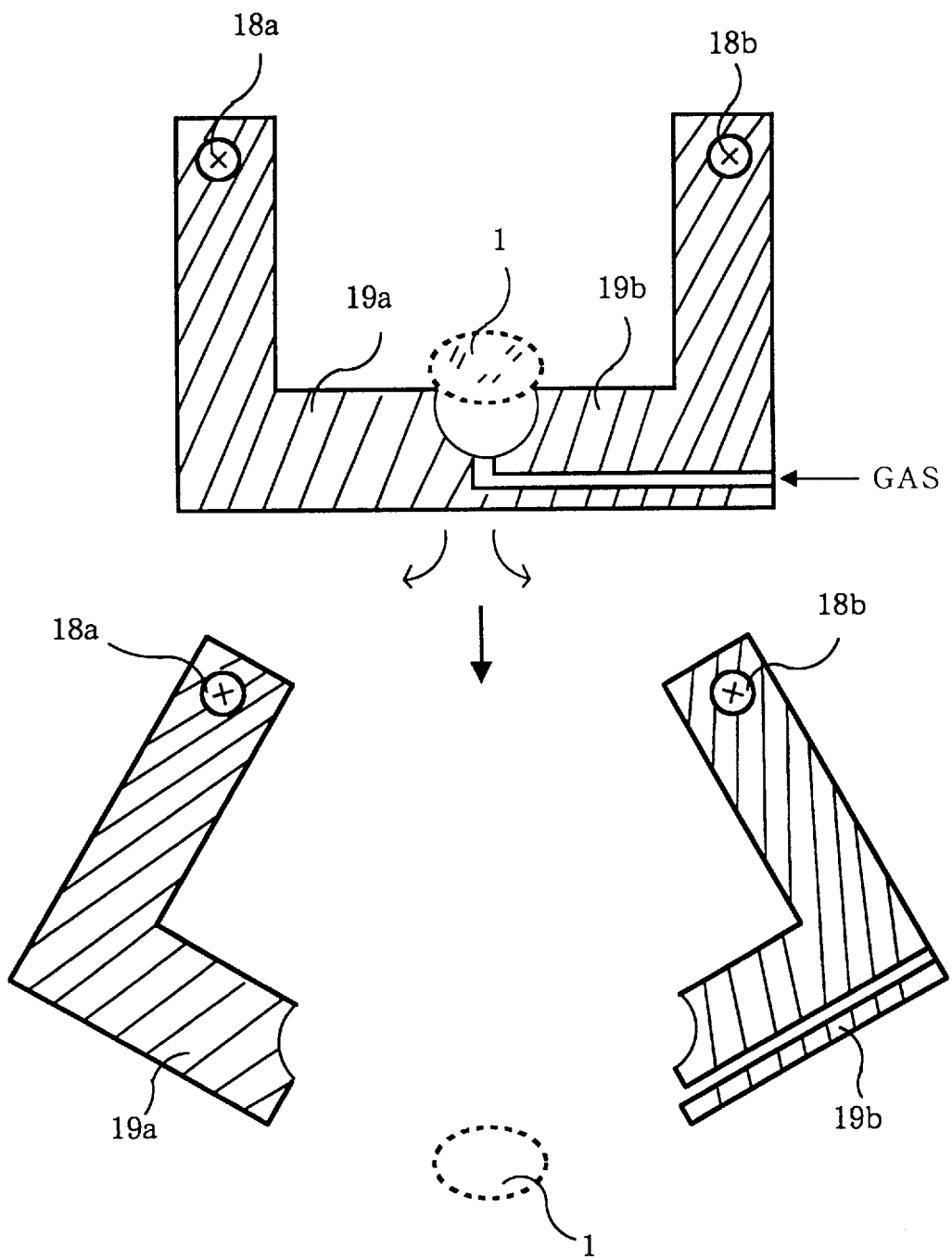
FIG. 15 is an explanatory schematic view of the method for transferring a softened glass preform to molds according to the present invention.

Further, the floating means may also be composed of floating means portions 17a and 17b, which have pivot shafts 18a and 18b respectively, as shown in FIG. 14. The floating means portions 17a and 17b can move downward by pivoting around the shafts 18a and 18b and, as a result of such pivoting movements, the floating means can open downward to drop the glass material 1. Further, as shown in FIG. 15, the floating means may also be composed of floating means portions 19a and 19b, which have pivot shafts 18a and 18b respectively. The floating means portions 19a and 19b can move downward by pivoting around the shafts 18a and 18b and, as a result of such pivoting movements, the floating means can open downward to drop the glass material 1.

In the embodiment of the present invention described above, the heated and softened glass material can be transferred into the molds in a moment by dropping the glass material.

Though the above-described embodiment has been explained by referring to softening and molding of glass preforms, glass optical elements can be manufactured by heating, transferring and molding glass materials other than glass preforms, for example, glass gobs.

Second Aspect of the Invention

The process according to the second aspect of the present invention is a process for manufacturing glass optical elements by press molding heated and softened glass material in preheated molds, which comprises:

heating a glass material at a temperature at which the glass material has a viscosity of lower than $10^9$ poises, preheating molds at a temperature at which the glass material has a viscosity of from $10^9$ to $10^{12}$ poises, subjecting the heated and softened glass material to initial press in the preheated molds for 3 to 60 seconds, cooling the vicinity of molding surfaces of the molds at a rate of 20° C./minute or more, and removing a molded glass article from the molds after the temperature of the vicinity of the molding surfaces of the mold becomes a temperature equal to or lower than a temperature at which the glass material has a viscosity of $10^{12}$ poises.

In one embodiment of the second aspect of the present invention described above, the molding surfaces of the molds have an amorphous and/or crystalline carbon mono-component or mixture layer of graphite structure and/or diamond structure.

Types, shapes and the like of glass materials used in the process according to the second aspect of the present invention may be similar to those used for the process according to the first aspect of the present invention.

In this molding process of the present invention, the glass material is softened by heating it to a temperature at which the glass material has a viscosity of lower than $10^9$ poises. Because of the viscosity of the glass material lower than $10^9$ poises, the glass material can be sufficiently deformed and molded in the molds preheated to a temperature at which the glass material has a viscosity not less than $10^9$ poises. To carry out the molding with a relatively low mold temperature, it is preferred that the glass material is softened by heating it to a temperature at which the glass material has a viscosity of from $10^{5.5}$ to $10^{7.6}$ poises.

The molds are preheated at a temperature at which the glass material has a viscosity of from $10^9$ to $10^{12}$ poises. At a temperature lower than a temperature at which the glass material has a viscosity of $10^{12}$ poises, it is difficult to sufficiently extend the glass material to obtain glass molded articles having a thin edge thickness, and it is also difficult to obtain high surface accuracy. At a temperature of molds higher than a temperature at which the glass material has a viscosity of $10^9$ poises, molding cycle time is unduly prolonged and mold lifetime is shortened.

Conventional molds can be used for the present invention as they are. However, those of which molding surfaces have an amorphous and/or crystalline carbon mono-component or mixture layer of graphite structure and/or diamond structure are preferred. In the molds having such carbon layers as described above, adhesion of glass would not occur even though the mold temperature is higher than the glass transition point of the glass material.

The carbon layers described above can be formed by spattering techniques, plasma CVD techniques, CVD techniques, ion plating techniques and the like. When the layers are formed by a spattering technique, spattering is preferably carried out by using a substrate temperature of 250° to 600° C., RF power density of 5 to 15 W/cm$^2$, degree of vacuum during spattering of $5\times10^{-4}$ to $5\times10^{-1}$ torr as well as an inert gas such as Ar as spattering gas and graphite as a spattering target.

When the layers are formed by a microwave plasma CVD technique, they are preferably formed under conditions of a substrate temperature of 650° to 1000° C., microwave power of 200 W to 1 kW, gas pressure of $10^{-2}$ to 600 torr by using methane and hydrogen gases as raw material gases.

When the layers are formed by an ion plating technique, they are preferably formed by using a substrate temperature of 200° to 450° C. and ionizing benzene gas.

The carbon layers include those with and without C—H bonds.

In this press molding process of the present invention, the heated and softened glass material is subjected to initial press in the preheated molds for 3 to 60 seconds. When the initial press is shorter than 3 seconds, extension of the glass would be insufficient and hence glass optical elements of desired shapes cannot be obtained. On the other hand, though longer initial press can provide higher surface accuracy, long initial press time makes it impossible to shorten cycle time and sometimes badly affects on mold lifetime, and therefore it should be equal to or shorter than 60 seconds. Molding pressure may be appropriately selected considering temperatures of the glass materials, molds and the like, and it may normally be a pressure in a range of from 30 to 300 kg/cm$^3$.

After molding, the vicinity of the molding surfaces of the molds is cooled at a rate equal to or more than 20° C./minute. The cooling rate may be smaller than 20° C./minute, but it only results in an unnecessarily long molding cycle time. Though it may vary depending on sizes and shapes of molded articles, it is preferred that the vicinity of the molding surfaces is cooled at a rate of from 20° to 180° C./minute to obtain high surface accuracy.

After the initial press, secondary press is preferably carried out at a constant pressure corresponding to 5 to 70% of the pressure of the initial press and the vicinity of the molding surfaces is cooled while maintaining the pressure, because this may provide good surface accuracy without sink mark and surface distortion. More preferably, the secondary press is carried out at a pressure corresponding to 20 to 50% of the pressure used for the initial press.

Further, to obtain final products with a center thickness within the allowance, it is preferred that the heated and softened glass materials are initially pressed so that it has a center thickness with in a range of from a thickness smaller than that of final products by 0.03 mm to a thickness larger than the same by 0.15 mm, and then subjected to the secondary press. Since in the secondary press the pressure is rapidly reduced and the glass have a high viscosity, the center thickness may be changed only by about 0.001 to 0.12 mm and hence it is easy to obtain the center thickness within a range of the allowance ±0.03 mm.

Regarding the initial press and the secondary press described above, the initial press is preferably stopped by a means for stopping initial press so that the glass material has a desired center thickness, i.e., a thickness within a range of from a thickness smaller than that of final products by 0.03 mm to a thickness larger than the same by 0.15 mm, and the secondary press is preferably started before the initial press is stopped or upon the stop of the initial press. Such an operation results in a desired center thickness and good surface accuracy because the initial press and the secondary press are carried out with continuous pressurization. When the desired center thickness is obtained by, for example, an external stopper, and then the secondary press is performed, it sometimes becomes difficult to obtain good surface accuracy because the press operation is interrupted for a moment. The initial press and the secondary press described above are preferably carried out in a double cylinder structure. Such a double cylinder structure will be explained in detail in the Examples hereinafter.

The glass molded articles press molded and cooled as described above are released from the molds when the temperature of the vicinity of the molding surfaces becomes below a temperature at which the glass material has a viscosity of $10^{12}$ poises. Glass materials having a viscosity exceeding $10^{12}$ poises do not show viscous flow in a short period of time and may be considered substantially solidified. Therefore, deformation and the like of the glass molded articles after the release from molds are prevented and good surface accuracy can be obtained. It is particularly preferred that the glass molded articles are released from the molds at a temperature at which the glass material has a viscosity of $10^{13}$ to $10^{14.5}$ poises.

The molds used in this process of the present invention are not particularly limited except for the molding surfaces. Those means for heating and cooling the molds described for the first aspect of the present invention may also be used for this process.

Figure 16:
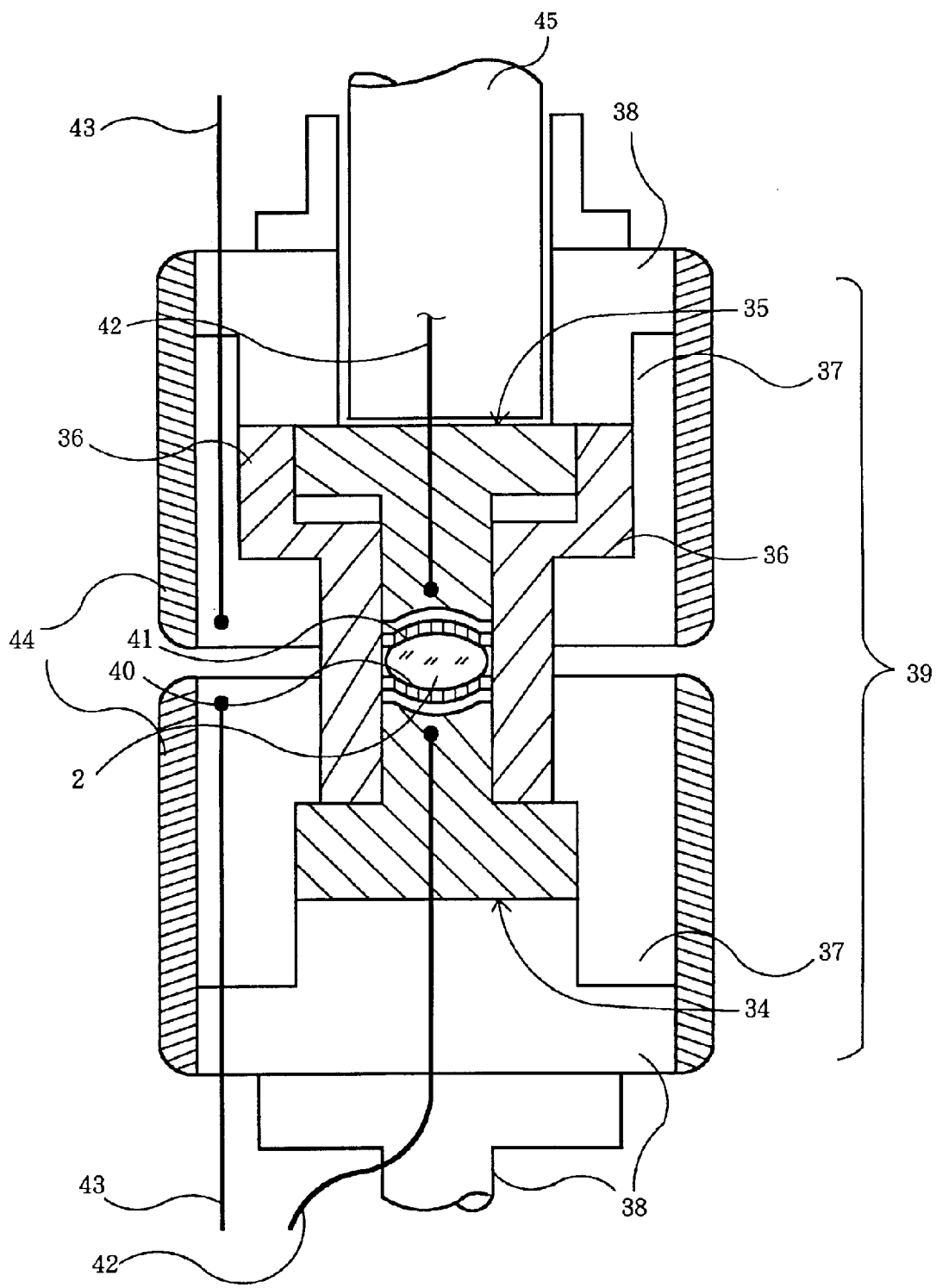
FIG. 16 is an explanatory schematic view of the press molding in a mold assembly used in the present invention.

The molds used for this process of the present invention may be, for example, a mold assembly 39 comprising an upper mold 35, a lower mold 34 and a guide mold 36 as shown in FIG. 16. However, molds are not limited to it. The molds may be those composed of silicon carbide, silicon, silicon nitride, tungsten carbide or cermets of aluminum oxide-base and cermets of titanium carbide-base and such materials preferably further coated with diamond, heat resistant metals, noble metal alloys, ceramics of carbides, nitrides, borides, oxides and the like. Particularly preferred are those obtained by forming a silicon carbide layer on a silicon carbide sintered body by a CVD technique, processing it into a finished shape and forming thereon an amorphous and/or crystalline carbon mono-component or mixture layer of graphite structure and/or diamond structure such as i-carbon layers by an ion-plating technique or the like. In the molds having such carbon layers as described above, adhesion of glass by fusion would not occur even if the molding is carried out at a relatively high molding temperature and molded articles are easily released from the molds at a relatively high temperature because of good mold release property.

In this process of the present invention, like the process according to the first aspect of the present invention, heating and softening of the glass materials can be performed while the materials are floated by a gas blow and the heated and softened glass materials are transferred to the preheated molds.

Type and flow rate of the gas for floating the glass materials by its blow may be similar to those described for the process according to the first aspect of the present invention, and floating of the glass materials by a gas blow and transfer of the glass materials may also be carried out as described for the process according to the first aspect of the present invention by referring to FIGS. 2 to 15.

According to the present invention, in a process for manufacturing glass optical elements by press molding a heated and softened glass material in preheated molds, even if the glass material is likely to be deformed when it is softened to a low viscosity, it can be heated and softened while easily holding it.

According to the present invention, glass optical elements having good optical properties can be manufactured by transferring a heated and softened glass material which is likely to be deformed to molds without unduly deforming it.

According the the present invention, glass optical elements can be manufactured by using a glass material which enables to provide a molded glass having a size approximately the same as the desired size of a purpose glass optical element after molding so that an edging volume for centering in post-processing may be minimized.

Further according to the present invention, glass optical elements having few surface defects and high surface accuracy can be manufactured while the cycle time required for the molding is markedly shortened.

In addition, according to the present invention, even biconvex lenses, meniscus lenses and the like with a small edge thickness can be easily manufactured.

According to the present invention, glass optical elements having good properties can be manufactured by transferring a heated and softened glass gob, which is prone to be deformed, to molds.

According to the present invention, it is possible to provide a process for manufacturing glass optical elements without sink marks and distortion and with high surface accuracy.

According to the present invention, it is possible to provide a process capable of manufacturing glass optical elements without sink marks and distortion and with high surface accuracy and a center thickness within allowance.

That is, according to the present invention, glass optical elements with few surface defects and high surface accuracy can be manufactured with a markedly shortened cycle time required for the press molding when compared with that of conventional processes by heating molds and glass preforms together (5 to 20 minutes/cycle).

Further, the present invention provides a process capable of manufacturing glass optical elements while completely preventing glass adhesion to molding surfaces.

EXAMPLES

The present invention will be further explained by referring to the following examples.

Example 1
Molds for Press Molding

Figure 17:
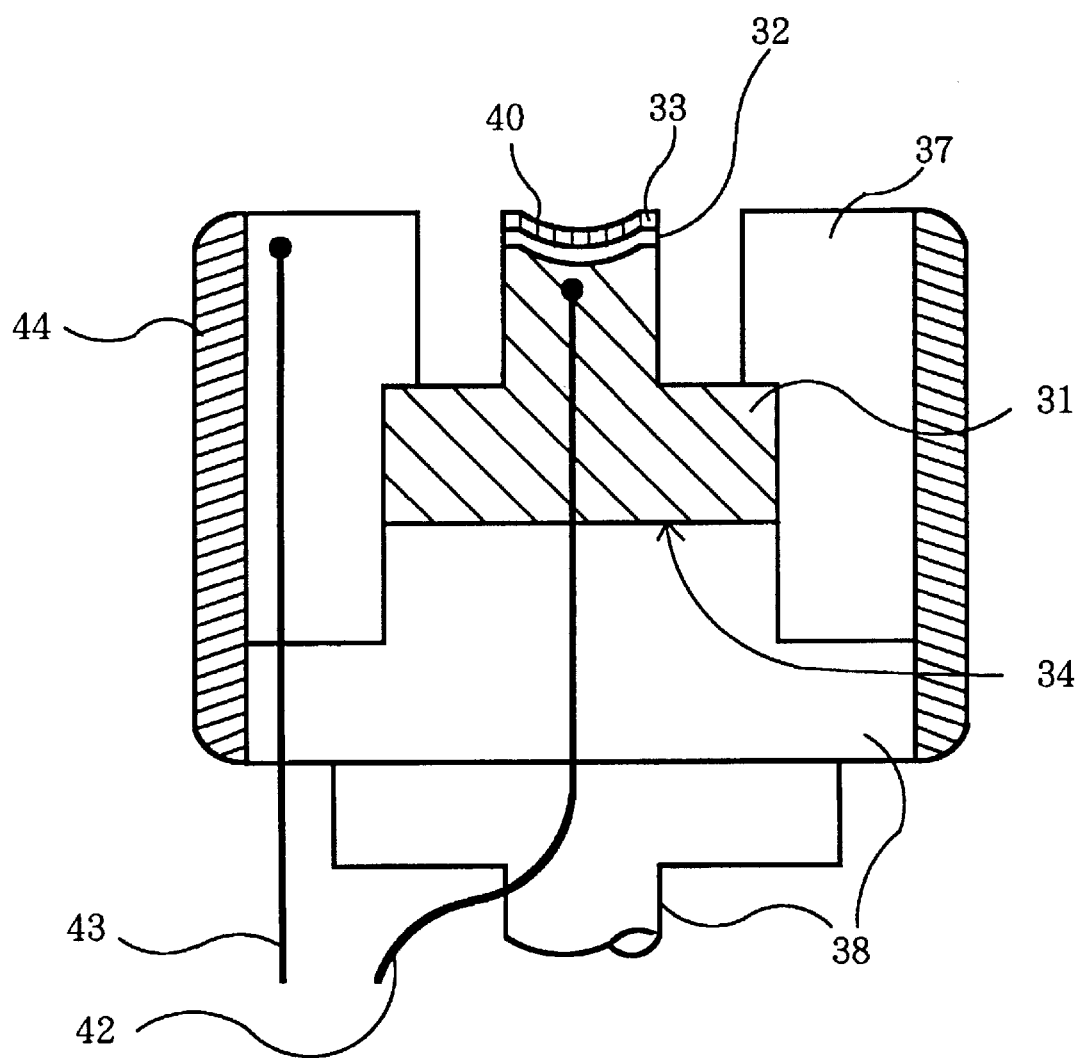
FIG. 17 is an explanatory schematic view of a lower mold of a mold assembly used in the Examples.

Molds for press molding comprised, as shown in FIG. 17, a mold substrate which was obtained by grinding a substrate material of silicon carbide (SiC) sintered body 31 into a shape of mold for press molding, forming a silicon carbide layer 32 on the molding surface portion by a CVD technique, grinding and polishing the surface to finish it as a mirror surface corresponding to the shape of glass molded articles to be produced. A layer of i-carbon (diamond-like carbon) 33 with a thickness of 500 Å was further formed on the silicon carbide layer 32 of the mold substrate by an ion plating technique to give a lower mold 34 having a molding surface 40 for manufacturing $\phi$ 18 mm biconvex glass lenses ($\phi$ 15 mm after edging for centering).

An upper mold 35 shown in FIG. 1 was also obtained in a manner similar to that for obtaining the lower mold 34 described above. The upper mold 35 and the lower mold 34 are disposed coaxially as shown in FIG. 1, and a mold assembly 39 was constituted by the upper mold 35 and the lower mold 34 as well as a guide mold 36 for guiding them upon press molding.

The lower mold 34 and the upper mold 35 were heated by mold heaters 44, which were provided around the outside of cylindrical molds 37 and controlled by a thermocouple 44 for measuring mold temperature inserted into inside of the lower mold 34 from lower part of a mold support 38. Temperature of the cylindrical molds 37 was measured by thermocouples 43 for measuring cylindrical mold temperature inserted into inside of the cylindrical molds 37.

Floating Means and Transfer Means

In a single closed chamber (not shown) including the mold heating structure described above, there were also provided a floating means and a transfer means shown in FIG. 2.

A glassy carbon floating means 10 (hereinafter referred to as "GC floating means") set on a floating means support 13 is disposed between glass softening heaters 14 for heating and softening a glass material (preform) 1. The glass material 1 was floated and held by a gas blow of 98% $N_2$+2% $H_2$ gas at a flow rate of 100 ml/minute fed from inside of the floating means support 13 to lower part of the GC floating means 10.

Further, outside the glass softening heaters 14, there was a glassy carbon vacuum pad 15 (hereinafter referred to as "GC vacuum pad"), which can move vertically and horizontally, and it was normally waiting at a position over the GC floating means 10.

Preheating and Press Processes

The closed chamber (not shown) including the press molding structure and the glass heating structure described above was evacuated to vacuum and 98% $N_2$+2% $H_2$ gas was introduced into the chamber to form an atmosphere of the gas in the chamber.

Then, the mold assembly was heated by the mold heaters 44 until the temperatures of the upper mold 35 and the lower mold 34 reached to 576° C. measured by the thermocouples 43 for measuring mold temperature so that they had a temperature around the deformation point of the preform 1 composed of barium borosilicate optical glass (marble-shaped hot formed article having a surface-defect-free mirror surface, weight; 1000 mg, transition point; 534° C., deformation point; 576° C.) and maintained at the same temperature. Glass viscosity at the transition point is $10^{13.4}$ poise and that at the deformation point is $10^{10-11}$ poise.

On the other hand, the glass preform 1 floating above the GC floating means 10 was heated by the glass softening heaters 14 to 700° C. where the glass has a viscosity of $10^6$ poises and softened.

Then, the GC vacuum pad 15, which had been kept waiting at the position outside the glass softening heaters 14 and over the GC floating means 10, was descended to the position of the preform 1 to catch the preform by suction. At this point, the GC vacuum pad had been heated by the radiation heat from the glass softening heaters 14 and had a temperature of from 300° to 400° C. and therefore it was not likely to react with the low viscosity glass.

Then, the GC vacuum pad 15 holding the preform 1 was immediately moved to a position above the lower mold 34 as shown in FIG. 6 and descended to a position near the molding surface 40 of the lower mold 34 and the suction was stopped to place the preform 1 on the molding surface 40 of the lower mold 34. After that, the GC vacuum pad 15 was removed from the position above the lower mold 34 and returned to the original waiting position and therefore there were no obstacles above the lower mold 34. The lower mold 34 was lifted up by the mold support 38 in a moment to a position under the upper mold 35, which was disposed coaxially with the lower mold 34 thereabove and fixed together with the mold support 38, to press mold the preform for 10 seconds at a pressure of 100 kg/cm² in the mold assembly 39 comprising the upper mold 35, the lower mold 34 and the guide mold 36 guiding them so that a desired thickness was obtained. Then, the mold heaters 44 were turned off and the glass molded article 2 and the mold assembly 39 were allowed to cool. Seventy seconds later, when the temperatures of the upper mold 35 and the lower mold 34 measured by the thermocouples 42 for measuring mold temperature became 534° C. corresponding to the glass transition point, the glass molded article 2 was released and removed from the mold assembly 39.

With respect to the glass molded article 2 (outer diameter; $\phi$ 18 mm, thickness; 2.9 mm, biconvex lens) obtained as described above, after annealing, surface accuracy was evaluated by an interferometer and surface quality was evaluated in terms of visual appearance and by a stereoscopic microscope. Results are shown in Table 1. The evaluation was performed with respect to five lenses obtained in the same manner (the same shall apply to the following examples). As a result, it was found that all of the lenses had good properties.

Example 2

Though the glass floating and softening structure was changed, the same mold assembly and molding conditions as in Example 1 were used.

Inside of the closed chamber including the press molding structure and the glass heating structure was evacuated to vacuum and 98% $N_2$+2% $H_2$ gas was introduced into the chamber to form an atmosphere of the gas in the chamber.

Then, the mold assembly was heated by the mold heaters 44 so that the upper mold 35 and the lower mold 34 had a temperature around deformation point of a preform 1 (the same glass type and the same shape as in Example 1), i.e., 576° C., and maintained at the same temperature. On the other hand, as shown in FIG. 4, the glass preform 1 above a porous ceramic floating means 17 which was disposed on a floating means support 19 and between the glass softening heaters 14 was heated to 700° C. where the glass has a viscosity of $10^6$ poises and softened, while it was floated by $N_2$ gas fed from inside of the floating means support 19 to lower part of the porous ceramic floating means 17 and blown off from pores of the floating means material at a flow rate of 200 ml/minute.

Then, a GC vacuum pad (not shown), which had been kept waiting at a position outside the glass softening heaters 14 and over the porous ceramic floating means 17, was descended to catch the softened floating preform 1 by suction. Then, the GC vacuum pad holding the preform 1 was immediately moved to a position above the lower mold 34 as shown in FIG. 6 and descended again to a position near the surface of the lower mold 34 and the suction was stopped to place the preform 1 on the molding surface 40 of the lower mold 34. After that, the GC vacuum pad 15 was moved back to the original waiting position.

Then, the lower mold 34 was lifted up by the mold support 38 to a position under the upper mold 35, which is disposed coaxially with the lower mold 34 thereabove, to press mold the glass material 1 for 10 seconds at a pressure of 100 kg/cm² in the mold assembly 39 comprising the upper mold 35, the lower mold 34 and the guide mold 36 guiding them so that a desired thickness was obtained. Then, the mold heaters 44 were turned off and, seventy seconds later, when the temperatures of the upper mold 35 and the lower mold 34 became 534° C. corresponding to the glass transition point, the glass molded article 2 was released and removed from the mold assembly 39.

Properties of the glass molded article 2 (the same shape as in Example 1) obtained as described above, after annealing, were evaluated in the same manner as in Example 1. Results are shown in Table 1.

Example 3

Except that the glass floating and softening structure was changed, Example 1 was repeated.

Inside of the closed chamber including the press molding structure and the glass heating structure was evacuated to vacuum and 98% $N_2$+2% $H_2$ gas was introduced into the chamber to form an atmosphere of the gas in the chamber.

Then, the mold assembly was heated so that the upper mold 35 and the lower mold 34 had a temperature around deformation point of a preform 1 (the same glass type and the same shape as in Example 1), i.e., 576° C. and maintained at that temperature.

On the other hand, the glass preform 1 was heated to 504° C. on a glass holding means 20 placed on a glass holding means support 21 between glass preheating heaters 22 so that the preform had a temperature lower than its glass transition point by 30° C. and maintained at that temperature. At that time, since the preform 1 does not exhibit flowability at the temperature, it does not need to be floated over the glass holding means 20.

Then, the GC vacuum pad, which had been kept waiting at the position outside the glass preheating heaters 22 and over the glass holding means 20, was descended to catch the preform 1 by suction and moved to a position above the tungsten alloy floating means 10, which had been preliminarily heated at 335° C. by the glass softening heater 14 so that it had a temperature lower than the glass transition temperature by 200° C. Then the pad was descended and simultaneously the suction was stopped to place the preform 1 on the receiving part of the floating means 10. The GC vacuum pad 15 was kept waiting at a position over the glass softening heaters 14.

The glass preform 1 was floated above the floating means 10 by a blow of 98% $N_2$+2% $H_2$ gas at a flow rate of 200 ml/minute, which was fed from inside of the floating means support 13 to the tungsten alloy floating means 10, and heated rapidly by the glass softening heaters 14 to 700° C. where the glass has a viscosity of $10^6$ poises. During this operation, because the temperature of the tungsten alloy floating means 10 had been made lower than that of the glass preform 1 by 170° C. when the preform 1 was placed on the floating means, the temperature of the tungsten alloy floating means 10 was always lower than the temperature of the glass even after the rapid heating. Therefore, the tungsten alloy floating means 10 did not react with the glass.

Then, the GC vacuum pad 15, which had been kept waiting over the glass softening heaters 14, was descended to catch the floating softened preform 1 by suction and immediately moved to the position above the lower mold 34 and descended again to a position near the surface of the lower mold 34 and the suction was stopped to place the preform 1 on the molding surface 40 of the lower mold 34. After that, the GC vacuum pad 15 was moved back to the original waiting position.

The lower mold 34 was lifted up by the mold support 38 to a position under the upper mold 35 disposed coaxially with the lower mold 34 thereabove to press mold the preform 1 for 10 seconds at a pressure of 100 kg/cm² in the mold assembly 39 shown FIG. 1 comprising the upper mold 35, the lower mold 34 and the guide mold 36 guiding them so that a desired thickness was obtained. Then, the mold heaters 44 were turned off and, seventy seconds later, when the temperatures of the upper mold 35 and the lower mold 34 became 534° C. corresponding to the glass transition point, the glass molded article 2 was released and removed from the mold assembly 39.

Properties of the glass molded article 2 (the same shape as in Example 1) obtained as described above, after annealing, were evaluated in the same manner as in Example 1. Results are shown in Table 1.

Example 4

Except that the mechanism for inserting a floating softened glass into the mold assembly was changed, Example 1 was repeated.

Inside of the closed chamber including the press molding structure and the glass heating structure was evacuated to vacuum and 98% $N_2$+2% $H_2$ gas was introduced into the chamber to form an atmosphere of the gas in the chamber.

Then, the mold assembly was heated so that the upper mold 35 and the lower mold 34 had a temperature around deformation point of a preform 1 (the same glass type and the same shape as in Example 1), i.e., 576° C. and maintained at the same temperature. Then, as shown in FIG. 7, the glass preform 1 was floated over the GC floating means 10 set on the floating means support 13 by a gas blow of 98% $N_2$+2% $H_2$ gas at a flow rate of 300 ml/minute, which was fed from inside of the floating means support 13 to lower part of the GC floating means 10, and heated to 700° C. where the glass has a viscosity of $10^6$ poises while it was floating. Then the floating means support 13 was moved to a position such that the floating softened preform 1 was located just below the upper mold 35.

Then, as shown in FIG. 8, the floating means support 13 was lifted up to transfer the preform 1 to a position near the surface of the upper mold 35 and the preform 1 was contacted to the surface of the upper mold 35 by sucking from the suction holes 45 provided on the inside wall of the guide mold 36 for guiding the upper mold 35 and the lower mold 34 at positions corresponding to the side faces of the preform 1. While sucking, the flow rate of the gas blow from the floating means 10 may be temporarily increased to lift up the preform 1 so that the preform can be more smoothly contacted to the surface of the upper mold 35.

Then, the floating means support 13 was moved from the position below the upper mold 35 back to the initial position for heating and softening the glass. Simultaneously, as shown in FIG. 9, the lower mold 34 was lifted up by the mold support 38 to a position under the upper mold 35 to press mold the preform 1 for 10 seconds at a pressure of 100 kg/cm² in the mold assembly 39 comprising the upper mold 35, the lower mold 34 and the guide mold 36 guiding them so that a desired thickness was obtained. Then, the mold heaters 44 were turned off and, seventy seconds later, when the temperatures of the upper mold 35 and the lower mold 34 became 534° C. corresponding to the glass transition point, the glass molded article 2 was released and removed from the mold assembly 39.

Properties of the glass molded article 2 (the same shape as in Example 1) obtained as described above, after annealing, were evaluated in the same manner as in Example 1. Results are shown in Table 1.

Example 5

Figure 18:
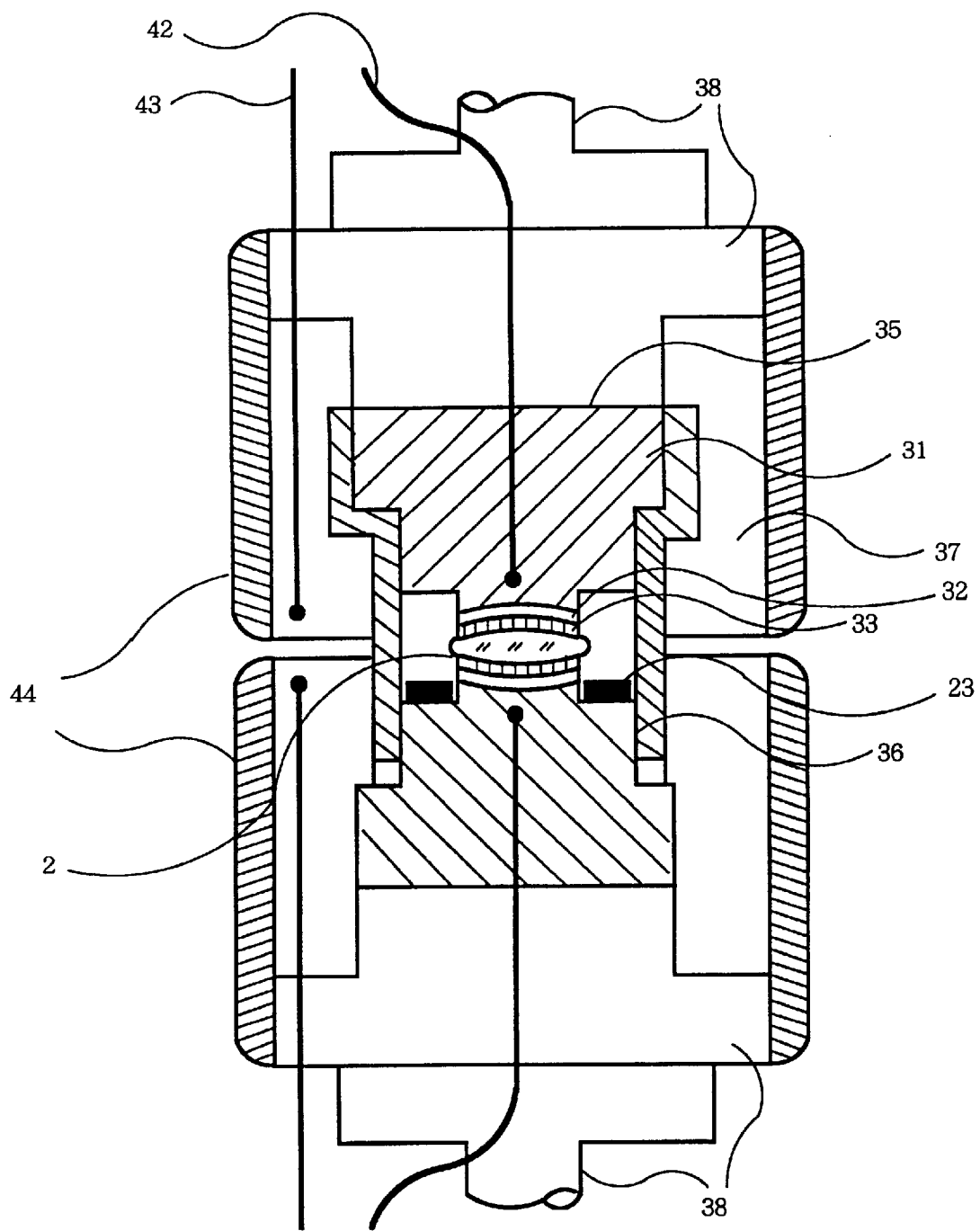
FIG. 18 is an explanatory schematic view of press molding in a mold assembly used in the Examples.

Schematic views of the apparatus and the mold assembly used in this example are shown in FIGS. 10, 11 and 18. The molds for molding had the same structure as in Example 1.

The closed chamber including the press molding structure and the glass heating structure was evacuated to vacuum and 98% $N_2$+2% $H_2$ gas was introduced into the chamber to form an atmosphere of the gas in the chamber.

Then, the mold assembly was heated by the mold heaters 44 until the temperatures of the upper mold 35 and the lower mold 34 reached to 592° C. at which a glass preform 1 (marble-shaped hot molded article having a surface-defect-free mirror surface, weight; 1800 mg, transition point; 534° C., deformation point; 576° C.) had a viscosity of $10^{10}$ poises and maintained at the same temperature.

On the other hand, as shown in FIG. 10, the preform 1 having a diameter slightly larger than that of the floating means on the GC floating means 10 was floated by a gas blow of 98% $N_2$+2% $H_2$ gas at a flow rate of 600 ml/minute, which was fed from inside of the floating means support 13 to lower part of the GC floating means 10, and heated to 660° C. at which the glass had a viscosity of $10^{7.2}$ poises while it was floating.

Then, a GC vacuum pad 24, which had been kept waiting at the position outside the glass softening heaters 14 and over the GC floating means 10, was descended to catch by suction a ring-like member 23 disposed at the vicinity of the GC floating means 10 and immediately ascended again. In this operation, when the periphery of the preform 1 having a diameter slightly larger than the outer diameter of the GC floating means 10 was pushed up by the inner periphery of the ring-like member 23 and the preform 1 was transferred with the ring-like member 23, the preform did not deformed by itself to sag and drop from the ring-like member 23, because the transfer was performed within a short period of time.

Then, as shown in FIG. 11, the GC vacuum pad 24 holding by suction the ring-like member 23 on which the preform 1 was placed was immediately moved to a position above the lower mold 34. After that, it was descended again to a position near the lower mold 34 and the suction was stopped to place the perform 1 on the molding surface 40 of the lower mold 34 and the ring-like member 23 on the flange provided at a position slightly lower than the molding surface, respectively. Then, the GC vacuum pad 24 was removed from the position above the lower mold 34 and the lower mold was lifted up by the mold support 38 to a position under the upper mold 35 disposed coaxially with the lower mold 34 thereabove to press mold the preform 1 for 10 seconds at a pressure of 100 kg/cm² in the mold assembly 39 comprising the upper mold 35, the lower mold 34 and the guide mold 36 guiding them so that a desired thickness was obtained. Then, the mold heaters 44 were turned off and, seventy seconds later, when the temperatures of the upper mold 35 and the lower mold 34 became 534° C. corresponding to the glass transition point, the glass molded article 2 was released and removed from the mold assembly 39.

Properties of the glass molded article 2 (ϕ 25 mm, ϕ 20 mm after centering, biconvex lens) obtained as described above, after annealing, were evaluated in the same manner as in Example 1. Results are shown in Table 1.

TABLE 1

| Example No. | Glass temperature (°C.) (Viscosity) | Floating Gas Flow Rate (cc/min) | Mold temperature at the beginning of molding (Viscosity) | Mold temperature when a molded glass was released from molds (Viscosity) | Evaluation of Glass Molded Articles | |
|---|---|---|---|---|---|---|
| | | | | | Surface Accuracy | Surface Quality |
| 1 | 700 ($10^6$ poises) | 100 | 576 ($10^{10.7}$ poises) | 534 ($10^{13.4}$ poises) | ◯ | ◯ |
| 2 | 700 ($10^6$ poises) | 200 | 576 ($10^{10.7}$ poises) | 534 ($10^{13.4}$ poises) | ◯ | ◯ |
| 3 | 700 ($10^6$ poises) | 200 | 576 ($10^{10.7}$ poises) | 534 ($10^{13.4}$ poises) | ◯ | ◯ |
| 4 | 700 ($10^6$ poises) | 300 | 576 ($10^{10.7}$ poises) | 534 ($10^{13.4}$ poises) | ◯ | ◯ |
| 5 | 660 ($10^{7.2}$ poises) | 600 | 590 ($10^{10.7}$ poises) | 534 ($10^{13.4}$ poises) | ◯ | ◯ |

Example 6

Glass molded articles were manufactured in the same manner as in Example 1 except that kinds of preform (glass types and shapes), floating gas flow rates and mold release temperatures indicated in Table 2 were used. Properties of the obtained glass molded articles were evaluated in the same manner as in Example 1. Results are shown in Table 2. All of the glass molded articles exhibited good properties.

TABLE 2

| Glass Article Temperature (Viscosity) | Shape | Floating Gas Flow Rate (cc/min) | Mold Temperature (°C.) (Viscosity) | Mold Release Temperature (°C.) (Viscosity) | Evaluation of Glass Molded Articles | |
|---|---|---|---|---|---|---|
| | | | | | Surface Precision | Surface Condition |
| 683° C. ($10^{8.5}$ poises) | Hot Formed Article | 300 | 576° C. ($10^{10.7}$ poises) | 549° C. ($10^{12.3}$ poises) | ◯ | ◯ |
| | | 600 | | | ◯ | ◯ |
| | Ground Spherical Surface Article (#800 diamond) | 300 | | | ◯ | ◯ |
| | | 600 | | | ◯ | ◯ |
| | Polished Sphere | 200 | | | ◯ | ◯ |
| | | 400 | | | ◯ | ◯ |
| 700° C. ($10^6$ poises) | Hot Formed Article | 300 | 568° C. ($10^{11.2}$ poises) | 534° C. ($10^{13.4}$ poises) | ◯ | ◯ |
| | | 600 | | | ◯ | ◯ |
| | Ground Spherical Surface Article (#800 diamond) | 300 | | | ◯ | ◯ |
| | | 600 | | | ◯ | ◯ |
| | Polished Sphere | 200 | | | ◯ | ◯ |
| | | 400 | | | ◯ | ◯ |
| 718° C. ($10^{5.5}$ poises) | Hot Formed Article | 300 | 557° C. ($10^{11.7}$ poises) | 525° C. ($10^{14}$ poises) | ◯ | ◯ |
| | | 600 | | | ◯ | ◯ |
| | Ground Spherical Surface Article (#800 diamond)P | 300 | | | ◯ | ◯ |
| | | 600 | | | ◯ | ◯ |
| | Polished Sphere | 200 | | | ◯ | ◯ |
| | | 400 | | | ◯ | ◯ |

Example 7
Mold Assembly for Press Molding
The same mold assembly as in Example 1 was used.
Floating Means In a single closed chamber (not shown) including the mold heating structure described above, there were provided floating means 10 (10a, 10b), guide means 50 (50a, 50b) shown in FIG. 12 and the glass softening heaters 13 for heating and softening glass materials. The floating means 10 was a split floating means composed of glassy carbon (hereinafter referred to "GC split floating means") and the guide means 50 was a split cylindrical guide composed of the same material (hereinafter referred to as "GC split cylindrical guide"). The glass material 1 was floated by a gas blow of 98% $N_2$+2% $H_2$ gas at a flow rate of 200 to 600 ml/minute supplied from inside of the GC split floating means.

Heating for Softening and Pressing Processes

The closed chamber including the press molding structure and the glass heating structure described above was evacuated to vacuum and 98% $N_2$+2% $H_2$ gas was introduced into the chamber to form an atmosphere of the same gas in the chamber.

Figure 19:
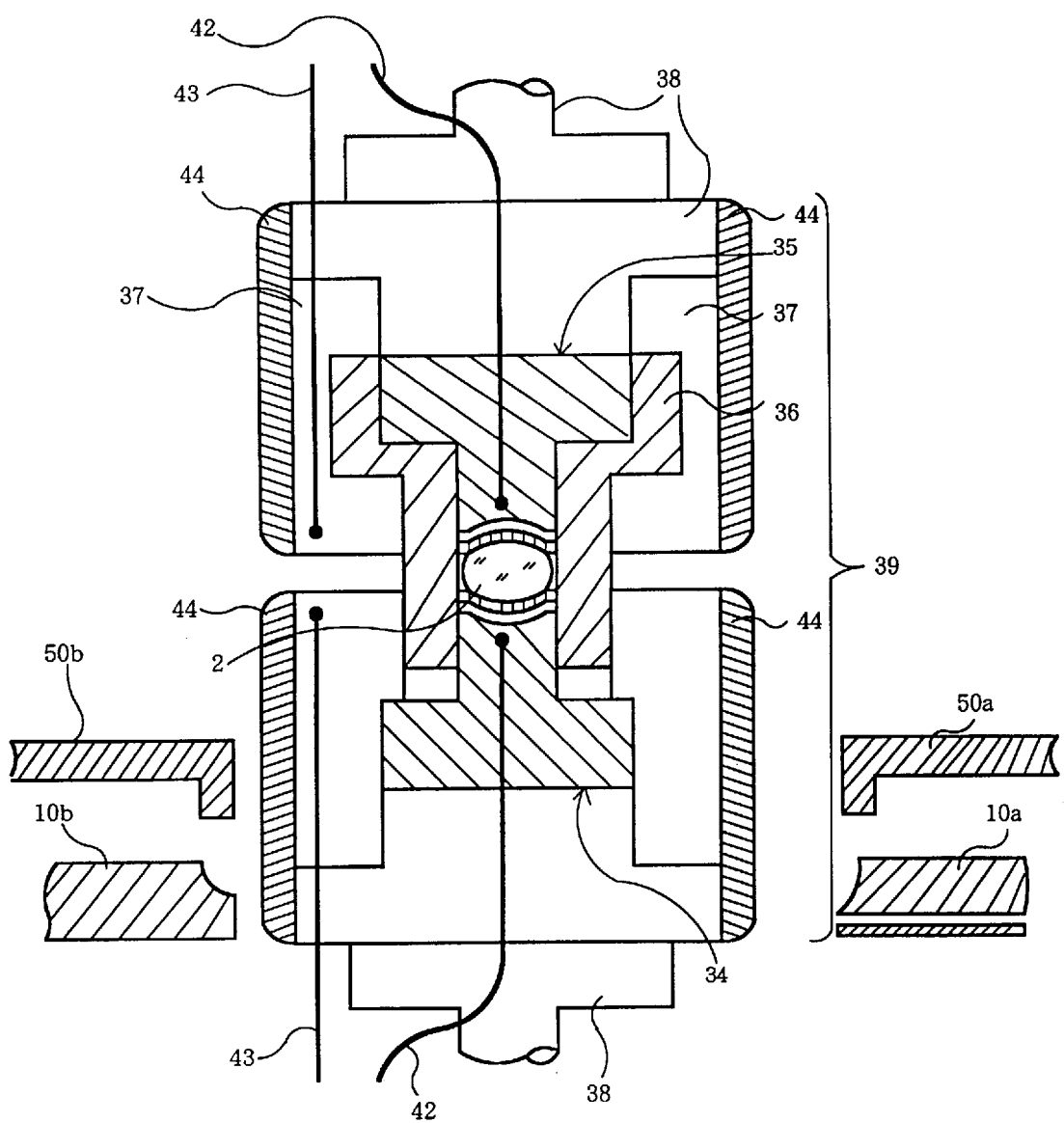
FIG. 19 is an explanatory schematic view of press molding in a mold assembly used in the Examples.

Then, the mold assembly was heated by the mold heaters 44 shown in FIG. 19 until the temperatures of the upper mold 35 and the lower mold 34 reached to 576° C., 565° C. or 557° C. measured by the thermocouples 43 for measuring mold temperature so that they had a temperature around the deformation point of a glass preform 1 identical to that of Example 1 and maintained at the same temperature (Table 3). In this operation, the upper mold and the lower mold were separately heated at different positions and assembled together as an integrated mold assembly as shown in FIG. 19 upon molding.

On the other hand, the glass material 1 (preform) above the GC split floating means 10 was heated by the glass softening heaters 13 to 683° C., 700° C. or 718° C. where the glass has a viscosity of $10^{6.5}$ to $10^{5.5}$ poises and maintained at the same temperatures.

Then, the GC split floating means 10 holding the floating heated and softened glass material 1 was immediately moved to the position just above the lower mold 34 and, as shown in FIG. 13, the GC split floating means 10a and the GC split floating means 10b were moved in horizontal direction to right and left in a moment to make an opening and drop the glass material 1 onto the molding surface 40 of the lower mold 34. The GC split cylindrical guide 50 having an inner diameter allowing an appropriate clearance against the maximum outer diameter of the glass material 1 was provided just above the GC split floating means 10. When the GC split floating means was opened and the glass material was dropped, the GC split cylindrical guide 50 served as a guide which minimize the setting deviation of the glass material 1 on the lower mold 34.

After the glass was dropped, the GC split cylindrical guides 50a and 50b were horizontally moved in opposite directions, right and left, to make an opening. Therefore, there are no obstacles above the lower mold 34 and the mold support 38 lifted up the lower mold in a moment to a position under the upper mold 35, which was disposed coaxially with the lower mold 34 thereabove and fixed together with the mold support 38, to press mold the glass material 1 for 10 seconds at a pressure of 100 kg/cm² in the mold assembly comprising the upper mold 35, the lower mold 34 and the guide mold 36 guiding them so that a desired thickness was obtained as shown in FIG. 19. Then, the mold heaters 44 were turned off and the glass molded article 2 and the mold assembly were allowed to cool. Seventy seconds later, when the temperatures of the upper mold 35 and the lower mold 34 measured by the thermocouples 43 for measuring mold temperature became 549° C., 534° C. or 525° C., the glass molded article 2 was released and removed from the mold assembly.

With respect to the glass molded articles 2 (outer diameter; φ 18 mm, thickness; 2.9 mm, biconvex lens) obtained as described above, after annealing, surface accuracy was evaluated by an interferometer and surface quality was evaluated in terms of visual appearance and by a stereoscopic microscope. Results are shown in Table 3.

In Table 3, shown are results of evaluation of glass molded articles obtained by varying temperature of the softened glass material 1, shape of the glass material 1, gas flow rate from the GC split floating means, mold temperature and mold release temperature. As a result, it was found that all of the molded articles (lenses) had good properties.

TABLE 3

| Glass Article | | Floating Gas | Mold Temperature | Mold Release | Evaluation of Glass Molded Articles | |
|---|---|---|---|---|---|---|
| Temperature (Viscosity) | Shape | Flow Rate (cc/min) | (°C.) (Viscosity) | Temperature (°C.) (Viscosity) | Surface Precision | Surface Condition |
| 683° C. ($10^{6.5}$ poises) | Hot Formed Article | 300 | 576° C. ($10^{10.7}$ poises) | 549° C. ($10^{12.3}$ poises) | ○ | ○ |
| | | 600 | | | ○ | ○ |
| | Ground Spherical Surface Article (#800 diamond) | 300 | | | ○ | ○ |
| | | 600 | | | ○ | ○ |
| | Polished | 200 | | | ○ | ○ |
| | Sphere | 400 | | | ○ | ○ |
| 700° C. ($10^6$ poises) | Hot Formed Article | 300 | 568° C. ($10^{11.2}$ poises) | 534° C. ($10^{13.4}$ poises) | ○ | ○ |
| | | 600 | | | ○ | ○ |
| | Ground Spherical Surface Article (#800 diamond) | 300 | | | ○ | ○ |
| | | 600 | | | ○ | ○ |
| | Polished | 200 | | | ○ | ○ |
| | Sphere | 400 | | | ○ | ○ |
| 718° C. ($10^{5.5}$ poises) | Hot Formed Article | 300 | 557° C. ($10^{11.7}$ poises) | 525° C. ($10^{14}$ poises) | ○ | ○ |
| | | 600 | | | ○ | ○ |
| | Ground Spherical Surface Article (#800 diamond)P | 300 | | | ○ | ○ |
| | | 600 | | | ○ | ○ |
| | Polished | 200 | | | ○ | ○ |
| | Sphere | 400 | | | ○ | ○ |

Examples 8-1 to 8-5

Mold Assembly for Press Molding

A mold assembly shown in FIG. 16 provided with the same molds as in Example 1 was used.

Floating Means and Transfer Means

In a single closed chamber (not shown) including the mold heating structure described above, there were also provided the floating means and the transfer means shown in FIG. 2.

Glass softening heaters 14 for heating and softening glass materials (preform) 1 were also provided and a glassy carbon floating means 10 (hereinafter referred to "GC floating means") set on a floating means support 13 was provided between the glass softening heaters 14. The glass material 1 was floated by a gas blow of 98% $N_2$+2% $H_2$ gas (Examples 8-1 to 8-3) or $N_2$ gas (Examples 8-4 and 8-5) at a flow rate indicated in Table 4 fed from inside of the floating means support 13 to lower part of the GC floating means 10.

Further, outside the glass softening heaters 14, there was a glassy carbon vacuum pad 15 (hereinafter referred to as "GC vacuum pad"), which can move vertically and horizontally, and it was normally waiting at a position over the GC floating means 10.

Heating for Softening and Pressing Processes

The closed chamber (not shown) including the press molding structure and the glass heating structure described above was evacuated to vacuum and 98% $N_2$+2% $H_2$ gas was introduced into the chamber to form an atmosphere of the same gas in the chamber.

The process will be exemplified below by utilizing a preform 1 composed of barium borosilicate optical glass (marble-shaped hot formed article having a surface-defect-free mirror surface, weight; 1000 mg, transition point; 534° C., deformation point; 576° C.). The mold assembly was heated by the mold heaters 44 until the temperatures of the upper mold 35 and the lower mold 34 (mold temperature) measured by the thermocouples 43 for measuring mold temperature had reached to a temperature indicated in Table 4 at which the preform had a viscosity also indicated in Table 4 and maintained at the same temperature. A part of relation between glass viscosity and its temperature was shown below.

| Glass Viscosity | Temperature |
|---|---|
| $10^9$ poises | 614° C. |
| $10^{10}$ poises | 592° C. |
| $10^{11}$ poises | 572° C. |
| $10^{12}$ poises | 554° C. |
| $10^{12.7}$ poises | 543° C. |
| $10^{13.4}$ poises | 534° C. |
| $10^{14.5}$ poises | 518° C. |

On the other hand, the glass preform 1 above the GC floating means 10 was heated by the glass softening heaters 14 to a temperature indicated in Table 4 corresponding to a viscosity also indicated in Table 4 to soften it while it was floated. Further relation between glass viscosity and its temperature was shown below.

| Glass Viscosity | Temperature |
|---|---|
| $10^{5.5}$ poises | 718° C. |
| $10^{6.4}$ poises | 686° C. |
| $10^{7.3}$ poises | 658° C. |
| $10^{8.2}$ poises | 634° C. |
| $10^{8.8}$ poises | 619° C. |

Then, the GC vacuum pad 15, which had ben kept waiting at a position outside the glass softening heaters 14 and over the GC floating means 10, was descended to the position of the preform 1 to catch preform 1 by suction. At this point, the GC vacuum pad had been heated by the radiation heat from the glass softening heaters and had a temperature of 300° to 400° C. and therefore it did not react with the low viscosity glass.

Then, as shown in FIG. 6, the GC vacuum pad 15 holding the preform 1 was immediately moved to the position above the lower mold 34 and descended again to a position near the molding surface 40 of the lower mold 34 and the suction was stopped to place the preform 1 on the molding surface 40 of the lower mold 34. After that, the GC vacuum pad 15 was moved from the position above the lower mold 34 back to the original waiting position and therefore there are no obstacles above the lower mold 34. The mold support 38 lifted up the lower mold in a moment to a position under the upper mold 35, which was disposed coaxially with the lower mold 34 thereabove and fixed together with the mold support 38, to press mold the preform 1 for 10 seconds at a pressure of 100 kg/cm² in the mold assembly 39 comprising the upper mold 35, the lower mold 34 and the guide mold 36 guiding them. In this molding process, the lower end of the guide mold 36 was stopped by a flange of the lower mold 34 to give a thickness of the molded article larger than that of final product by 30 μm. On the other hand, five seconds after the start of the pressing with the first cylinder, a pressure of 20 kg/cm² (Examples 8-1 to 8-5) was applied to the back side of the upper mold 35 by a pushing bar 45 connected to the second cylinder which was provided inside the first cylinder to pressurize and hold the glass molded article 2 and the mold assembly 39. Then, the mold heaters 44 were turned off and the glass molded article 2 and the mold assembly 39 were allowed to cool. After a period of time indicated in Table 4 as molding time (initial press time [10 seconds] + secondary press time) was passed, mold temperatures of the upper mold 35 and the lower mold 34 measured by the thermocouples 42 for measuring mold temperature reached to a temperature indicated in Table 4 as mold release temperature and a desired thickness of the glass molded article was obtained, the glass molded article 2 was released and removed from the mold assembly 39. Relation between glass viscosity and its temperature was shown above.

With respect to the glass molded articles 2 (biconvex lenses having an outer diameter;φ18 mm, thickness; 2.9 mm, and edge thickness; 1.0 mm) obtained as described above, after annealing, surface accuracy was evaluated by an interferometer and surface quality was evaluated in terms of visual appearance and by a stereoscopic microscope. Results are shown in Table 4 as Examples 8-1 to 8-5. As a result, it was found that all of the lenses had good properties.

Examples 9-1 to 9-5

Mold Assembly for Press Molding

The used mold assembly for press molding was the same as in Example 7 except that it did not have the pushing bar 45.

Floating Means

In a single closed chamber (not shown) including the mold heating structure described above, there were provided the floating means 10 (10a, 10b), the guide means 50 (50a, 50b) shown in FIG. 12 and the glass softening heaters (not shown). The floating means 10 was a split floating means composed of glassy carbon (hereinafter referred to "GC split floating means") and the guide means 50 was a split cylindrical guide composed of the same material (hereinafter referred to as "GC split cylindrical guide"). The glass material 1 was floated by a gas blow of 98% $N_2$+2% $H_2$ gas at a flow rate indicated in Table 4 supplied from inside of the GC split floating means.

Heating for Softening and Pressing Processes

The closed chamber including the press molding structure and the glass heating structure described above was evacuated to vacuum and 98% $N_2$+2% $H_2$ gas was introduced into the chamber to form an atmosphere of the same gas in the chamber.

Then, the mold assembly was heated by the mold heaters 44 shown in FIG. 19 until the temperatures of the upper mold 35 and the lower mold 34 reached to 572° C. (Examples 9-1 to 9-3 and 9-5) or 554° C. (Example 9-4) measured by the thermocouples 43 for measuring mold temperature at which temperatures the same glass material as in Example 8 shows a viscosity of $10^{11}$ or $10^{12}$ poises, respectively, and maintained at the same temperature. In this operation, the upper mold and the lower mold were separately heated at different positions and assembled together as an integrated mold assembly as shown in FIG. 19 upon molding.

On the other hand, the glass material 1 above the GC split floating means 10 was heated by the glass softening heaters to 718 ° C. where the glass had a viscosity of $10^{5.5}$ poises as indicated in Table 4 and maintained at the same temperature.

Then, the GC split floating means 10 holding the floating glass material 1 was immediately moved to a position just above the lower mold 34 and, as shown in FIG. 13, the GC split floating means 10a and the GC split floating means 10b were splitted and moved horizontally in opposite directions, right and left, in a moment to make an opening and thereby drop the glass material 1 onto the molding surface 40 of the lower mold 34. The GC split cylindrical guide 50 having an inner diameter allowing an appropriate clearance against the maximum outer diameter of the glass material 1 was provided just above the GC split floating means 10. When the GC split floating means 10 was opened and the glass material 1 was dropped, the GC split cylindrical guide 50 served as a guide which minimizes the setting deviation of the glass material 1 on the lower mold 34.

After the glass was dropped, the GC split cylindrical guides 50a and 50b were horizontally moved in opposite directions, right and left, to make an opening. Therefore, there are no obstacles above the lower mold 34 and the mold support 38 lifted up the lower mold 34 in a moment to the upper mold 35, which was disposed coaxially with the lower mold 34 thereabove and fixed together with the mold support 38, to press mold the glass material 1 for 10 seconds at a pressure of 100 kg/cm$^2$ in the mold assembly comprising the upper mold 35, the lower mold 34 and the guide mold 36 guiding them so that a desired thickness was obtained and the pressure was changed to 50 kg/cm$^2$ in a moment. Then, the mold heaters 44 were turned off and the glass molded article 2 and the mold assembly were allowed to cool. After a period of time indicated in Table 4 as molding time (initial press time [10 seconds] + secondary press time) was passed and the temperatures of the upper mold 35 and the lower mold 34 measured by the thermocouples 43 for measuring mold temperature reached to a temperature indicated in Table 4 as mold release temperature, the glass molded article 2 was released and removed from the mold assembly, With respect to the glass molded articles 2 (biconvex lenses having an outer diameter;φ18 mm, thickness; 2.9 mm and edge thickness; 1.0 mm) obtained as described above, after annealing, surface accuracy was evaluated by an interferometer and surface quality was evaluated in terms of visual appearance and by a stereoscopic microscope. Results are shown in Table 4.

In Table 4, shown are results of evaluation of glass molded articles obtained by varying temperature of the softened glass material 1, shape of the glass material 1, gas flow rate from the GC split floating means, mold temperature and mold release temperature. As a result, it was found that all of the molded articles (lenses) had good properties.

Examples 10-1 to 10-3

Glass molded articles (biconvex lenses having an outer diameter;φ18 mm, thickness; 2.9 mm and edge thickness; 1.0 mm) were obtained in the same manner as in Example 8-1 except that the initial press time was 5 seconds (Example 10-1), 30 seconds (Example 10-2) or 55 seconds (Example 10-3). With respect to the glass molded articles after annealing, surface accuracy was evaluated by an interferometer and surface quality was evaluated in terms of visual appearance and by a stereoscopic microscope. Results are shown in Table 4.

Examples 11-1 and 11-2

Glass molded articles (biconvex lenses having an outer diameter;φ18 mm, thickness; 2.9 mm and edge thickness; 1.0 mm) were obtained in the same manner as in Example 8-1 except that the mold assembly was allowed to start to cool at the start of the initial press (pressed with a pressure of 100 kg/cm$^2$) (Example 11-1) or five second after the start of the initial press (Example 11-2).

With respect to the glass molded articles after annealing, surface accuracy was evaluated by an interferometer and surface quality was evaluated in terms of visual appearance and by a stereoscopic microscope. Results are shown in Table 4.

TABLE 4

| Example No. | Glass Temperature (°C.) (Viscosity) | Floating Gas Flow Rate (l/min) | Mold Temperature at Start of Molding (°C.) (Viscosity) | Molding Pressure (kg/cm$^2$) Initial Press | Molding Pressure (kg/cm$^2$) Secondary Press | Molding Time (sec) | Cooling Rate (°C./min) | Mold Temperature at Mold Release (°C.) (Viscosity) | Evaluation of Glass Molded Articles Surface Precision | Evaluation of Glass Molded Articles Surface Condition |
|---|---|---|---|---|---|---|---|---|---|---|
| 8-1 | 686° C. ($10^{6.4}$ poises) | 0.5 | 592° C. ($10^{10}$ poises) | 100 | 20 | 85 | 47 | 534° C. ($10^{13.4}$ poises) | ◎ | ◎ |
| 8-2 | 686° C. ($10^{6.4}$ poises) | 0.5 | 572° C. ($10^{11}$ poises) | 100 | 20 | 70 | 26 | 546° C. ($10^{12.5}$ poises) | ◎ | ◎ |
| 8-3 | 658° C. ($10^{7.3}$ poises) | 1.0 | 614° C. ($10^{9}$ poises) | 100 | 20 | 85 | 65 | 534° C. ($10^{13.4}$ poises) | ◎ | ◎ |
| 8-4 | 658° C. ($10^{7.3}$ poises) | 1.0 | 592° C. ($10^{10}$ poises) | 100 | 20 | 50 | 57 | 554° C. ($10^{12.0}$ poises) | ○ | ◎ |
| 8-5 | 620° C. ($10^{8.8}$ poises) | 1.0 | 610° C. ($10^{9.2}$ poises) | 100 | 20 | 90 | 64 | 525° C. ($10^{14.0}$ poises) | ◎ | ◎ |
| 9-1 | 718° C. ($10^{5.5}$ poises) | 0.5 | 572° C. ($10^{11}$ poises) | 100 | 50 | 70 | 29 | 543° C. ($10^{12.7}$ poises) | ◎ | ◎ |
| 9-2 | 718° C. ($10^{5.5}$ poises) | 0.5 | 572° C. ($10^{11}$ poises) | 100 | 50 | 70 | 43 | 529° C. ($10^{18.7}$ poises) | ◎ | ◎ |
| 9-3 | 718° C. ($10^{5.5}$ poises) | 0.5 | 572° C. ($10^{11}$ poises) | 100 | 50 | 85 | 45 | 516° C. ($10^{14.7}$ poises) | ○ | ◎ |
| 9-4 | 718° C. ($10^{5.5}$ poises) | 0.5 | 554° C. ($10^{12}$ poises) | 100 | 50 | 70 | 21 | 534° C. ($10^{13.4}$ poises) | ◎ | ◎ |
| 9-5 | 718° C. ($10^{5.5}$ poises) | 0.5 | 572° C. ($10^{11}$ poises) | 100 | 20 | 82 | 45 | 518° C. ($10^{14.5}$ poises) | ◎ | ◎ |
| 10-1 | 686° C. ($10^{6.4}$ poises) | 0.5 | 592° C. ($10^{10}$ poises) | 100 | 20 | 80 | 47 | 534° C. ($10^{13.4}$ poises) | ◎ | ◎ |

TABLE 4-continued

| Example No. | Glass Temperature (°C.) (Viscosity) | Floating Gas Flow Rate (l/min) | Mold Temperature at Start of Molding (°C.) (Viscosity) | Molding Pressure (kg/cm²) Initial Press | Molding Pressure (kg/cm²) Secondary Press | Molding Time (sec) | Cooling Rate (°C./min) | Mold Temperature at Mold Release (°C.) (Viscosity) | Evaluation of Glass Molded Articles Surface Precision | Evaluation of Glass Molded Articles Surface Condition |
|---|---|---|---|---|---|---|---|---|---|---|
| 10-2 | 686° C. ($10^{6.4}$ poises) | 0.5 | 592° C. ($10^{10}$ poises) | 100 | 20 | 105 | 47 | 534° C. ($10^{13.4}$ poises) | ⊚ | ⊚ |
| 10-3 | 686° C. ($10^{6.4}$ poises) | 0.5 | 592° C. ($10^{10}$ poises) | 100 | 20 | 130 | 47 | 534° C. ($10^{13.4}$ poises) | ⊚ | ⊚ |
| 11-1 | 686° C. ($10^{6.4}$ poises) | 0.5 | 592° C. ($10^{10}$ poises) | 100 | 20 | 75 | 47 | 534° C. ($10^{13.4}$ poises) | ⊚ | ⊚ |
| 11-2 | 686° C. ($10^{6.4}$ poises) | 0.5 | 592° C. ($10^{10}$ poises) | 100 | 20 | 80 | 47 | 534° C. ($10^{13.4}$ poises) | ⊚ | ⊚ |

The symbols used in the evaluation of the glass molded articles have the following meanings.

Surface Accuracy

○: not more than 0.5 fringes of irregularity

⊚: not more than 0.2 fringes of irregularity

Surface Quality

⊚: good.

In the above examples of the present invention, used were the molds obtained by forming a silicon carbide layer on a silicon carbide sintered body by a CVD technique and forming thereon an i-carbon layer by an ion-plating technique. However, in addition to such molds, it was found that those composed of silicon, silicon nitride, tungsten carbide or cermets of aluminum oxide-base and cermets of titanium carbide-base and such materials further coated with diamond, heat resistant metals, noble metal alloys, ceramics of carbides, nitrides, borides, oxides and the like may be used. However, the i-carbon layer was particularly preferred since it showed good mold release property.

In the above Examples 8 to 11, the cycle time was a sum of molding time and recovery time of mold temperature (time required for elevating a mold temperature at mold release to a temperature required for starting the molding). Since the molds were heated by resistance heating in those examples, the recovery time was about 35 seconds. Therefore, the cycle time was about 85 to 165 seconds.

The recovery time may be shortened to about 10 seconds by performing the heating of the molds with high-frequency heating or infrared heating, and hence the cycle time may be shortened as much as the time shortened by the heating means.

What is claimed is:

1. A process for manufacturing glass optical elements by press molding a heated and softened glass material in preheated molds wherein the glass material is heated to reduce the viscosity thereof while the material is floated by blowing gas and the heated and softened glass material is transferred to the preheated molds and then press molded.

2. A process according to claim 1 wherein the glass material is a glass preform.

3. The process according to claim 2, wherein the glass preform is floated by blowing gas which is from an upper opening in a support.

4. The process according to claim 3, wherein the blowing gas is from at least one opening on the bottom of the upper opening.

5. The process according to claim 2, wherein the glass preform having a temperature ranging from room temperature to 200° C. is further heated while it is floated by blowing gas.

6. The process according to claim 2, wherein the glass preform is heated to a temperature lower than its glass transition temperature by 30° C. or more and then it is further heated and softened while it is floated by blowing gas.

7. The process according to claim 2, wherein the heated and softened glass preform has a viscosity of from $10^{5.5}$ to $10^{9.0}$ poises.

8. The process according to claim 2, wherein the heated and softened glass preform is held by suction and transferred to the preheated molds.

9. The process according to claim 8, wherein the heated and softened glass preform is held by suction and transferred to the molds by means of a movable suction holding means having a lower opening.

10. The process according to claim 9, wherein the softened glass preform is held by suction and transferred to the molds by means of a movable suction holding means having a lower opening and then the softened preform is press molded between molding surfaces of a lower mold and an upper mold.

11. The process according to claim 2, wherein the heated and softened glass preform is press molded between molding surfaces of a lower mold and an upper mold, and the softened preform is held by suction from suction holes provided in the vicinity of the molding surface of the upper mold.

12. The process according to claim 2, wherein the heated and softened preform is placed on a ring-like member having an inner diameter smaller than an outer diameter of the preform and transferred to the preheated molds together with the ring-like member.

13. The process according to claim 12, wherein the preform is floated by blowing gas which is from an upper opening in a support.

14. The process according to claim 13, wherein the upper opening has an outer diameter smaller than the inner diameter of the ring-like member.

15. The process according to claim 1, wherein the heated and softened glass material is transferred to the preheated molds by dropping the material.

16. The process according to claim 15, wherein the glass material is a glass preform.

17. The process according to claim 16, wherein the heated and softened glass preform is dropped by splitting a floating means used for heating the preform into two or more pieces and removing the pieces.

18. The process according to claim 15, for manufacturing glass optical elements by press molding a heated and softened glass gob in preheated molds wherein the glass gob is softened by heating while it is floated by blowing gas and the heated and softened glass gob is dropped by splitting a floating means used for heating the glass gob into two or more pieces and removing the pieces so that the glass gob is transferred to the preheated molds and subjected to press molding.

19. The process according to claim 18, wherein the heated and softened glass gob has a viscosity of from $10^{5.5}$ to $10^{9.0}$ poises.

20. The process according to claim 15, wherein a guide means is used for dropping the heated and softened glass preform or glass gob in a certain direction.

21. The process according to claim 1, wherein the glass material is heated to reduce the viscosity to such an extent that the glass material is capable of being molded in the preheated molds.

22. The process according to claim 21, wherein the glass material is heated to a viscosity of from $10^{5.5}$ to $10^{9.0}$ poises.

23. The process according to claim 3, wherein the upper opening has a diameter smaller than a diameter of the preform.

24. The process according to claim 3, wherein the upper opening has a diameter equal to a diameter of the preform.

25. The process according to claim 3, wherein the upper opening has a diameter bigger than a diameter of the preform.

26. The process according to claim 2, wherein the glass preform is floated by blowing gas which is from a porous material which has a spherical surface having a curvature similar to that of the preform.

27. The process according to claim 2, wherein the glass preform is floated by blowing gas which is from a porous material which has a flat surface.

28. The process according to claim 11, wherein the lower mold is moved to a position under the softened preform held by suction at the vicinity of the molding surface of the upper mold and then the softened preform is press molded between molding surfaces of the lower mold and the upper mold.

29. The process according to claim 11, wherein the softened preform held by suction at the vicinity of the molding surface of the upper mold is moved to a position above the molding surface of the lower mold and then the softened preform is press molded between molding surfaces of the lower mold and the upper mold.

30. The process according to claim 13, wherein the upper opening has a diameter smaller than a diameter of the preform.

31. The process according to claim 13, wherein the upper opening has a diameter equal to a diameter of the preform.

32. The process according to claim 13, wherein the upper opening has a diameter bigger than a diameter of the preform.

33. The process according to claim 1, for manufacturing glass optical elements by press molding a heated and softened a glass gob in preheated molds wherein the heated and softened glass gob is transferred to the preheated molds by holding it by suction.

34. The process according to claim 1, for manufacturing glass optical elements by press molding a heated and softened a glass gob in preheated molds wherein the heated and softened glass gob is transferred to the preheated molds by holding it by placing it on a ring-like member having an inner diameter smaller than the outer diameter of the glass gob and subjected to press molding.

35. The process according to claim 33, wherein the glass gob is held by suction by means of a movable suction holding means having a lower opening.

36. The process according to claim 33, wherein the glass gob is press molded between molding surfaces of a lower mold and an upper mold and the glass gob is held by suction from suction holes provided in the vicinity of the molding surface of the upper mold.

* * * * *